United States Patent
Nikami et al.

(10) Patent No.: US 10,223,323 B2
(45) Date of Patent: Mar. 5, 2019

(54) APPARATUS AND METHOD FOR CONTROLLING THE NUMBER OF LANES USED FOR TRANSFERRING DATA BETWEEN INFORMATION PROCESSING APPARATUSES

(71) Applicant: FUJITSU LIMITED, Kawasaki-shi, Kanagawa (JP)

(72) Inventors: Atsuyuki Nikami, Kawasaki (JP); Toshiyuki Shimizu, Kawasaki (JP); Tomohiro Inoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 367 days.

(21) Appl. No.: 14/833,382

(22) Filed: Aug. 24, 2015

(65) Prior Publication Data

US 2016/0062943 A1     Mar. 3, 2016

(30) Foreign Application Priority Data

Aug. 28, 2014   (JP) ................ 2014-173535

(51) Int. Cl.
G06F 13/00    (2006.01)
G06F 13/42    (2006.01)
G06F 13/40    (2006.01)

(52) U.S. Cl.
CPC ...... *G06F 13/4286* (2013.01); *G06F 13/4022* (2013.01); *G06F 13/4282* (2013.01); *Y02D 10/14* (2018.01); *Y02D 10/151* (2018.01)

(58) Field of Classification Search
CPC ............. G06F 13/4022; G06F 13/4282; G06F 13/4286; Y02B 60/1228; Y02B 60/1235
See application file for complete search history.

(56) References Cited

U.S. PATENT DOCUMENTS 7,136,953 B1 * 11/2006 Bisson ............... G06F 13/4018
                                                        710/29
9,229,525 B2 *  1/2016 Reller .................. G06F 1/3253
(Continued)

FOREIGN PATENT DOCUMENTS

JP     2008-547362    12/2008
JP     2010-283696    12/2010
(Continued)

OTHER PUBLICATIONS

Japanese Office Action dated Apr. 3, 2018 from Japanese Patent Application No. 2014-173535, 7 pages.
(Continued)

*Primary Examiner* — Idriss N Alrobaye
*Assistant Examiner* — Richard B Franklin
(74) *Attorney, Agent, or Firm* — Staas & Halsey LLP

(57) ABSTRACT

First and second apparatuses are connected with each other through a communication path provided with a plurality of lanes used for data transfer that is performed between the first and second apparatuses. Prior to data transfer, transfer-control information is exchanged between the first and second apparatuses according to a predetermined communication protocol. Upon detecting transfer-control information, the first apparatus notifies the second apparatus of a lane-control instruction to increase a second lane-counter indicating a number of lanes used by the second apparatus, and increases a first lane-counter indicating a number of lanes used by the first apparatus so that the first lane-counter is greater than a number of lanes that have been used when detecting the transfer-control information. Upon detecting the lane-control instruction, the second apparatus increases the second lane-counter so that the second lane-counter is greater than a number of lanes that have been used when detecting the instruction.

20 Claims, 10 Drawing Sheets

(56) References Cited

U.S. PATENT DOCUMENTS

2007/0008898 A1   1/2007  Sharma et al.
2011/0222111 A1   9/2011  Shima

FOREIGN PATENT DOCUMENTS

| JP | 2011-123798 | 6/2011 |
| JP | 2011-186894 | 9/2011 |
| JP | 2011-199361 | 10/2011 |

OTHER PUBLICATIONS

Naito Ryuji, "PCI Express made from zero with FPGA, a standard bus for PC extension does so and moves it (TECH I Bus Interface)", vol. 54, pp. 67 to pp. 107, May 1, 2013, CQ Publishing Co., Ltd. **.

* cited by examiner

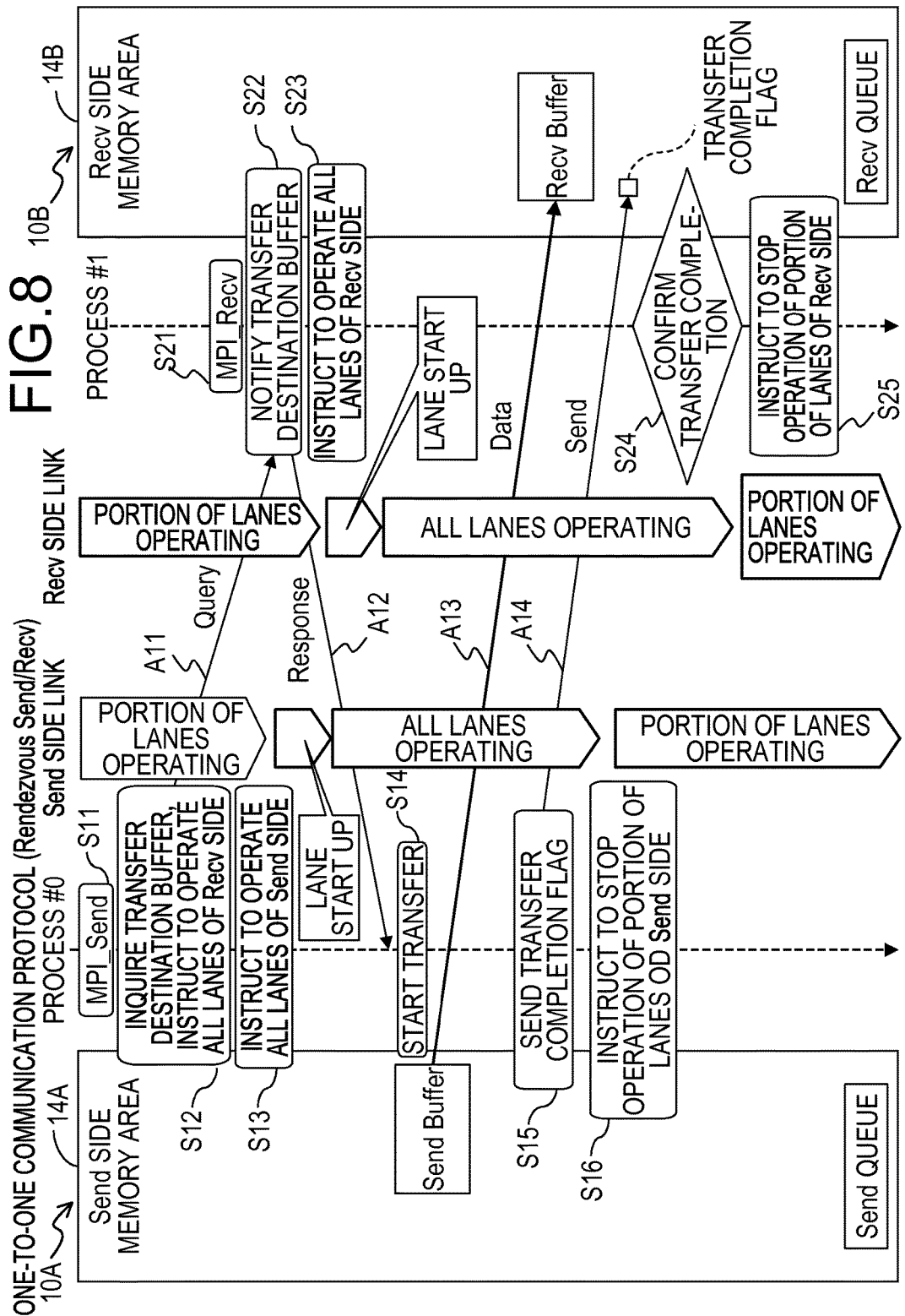

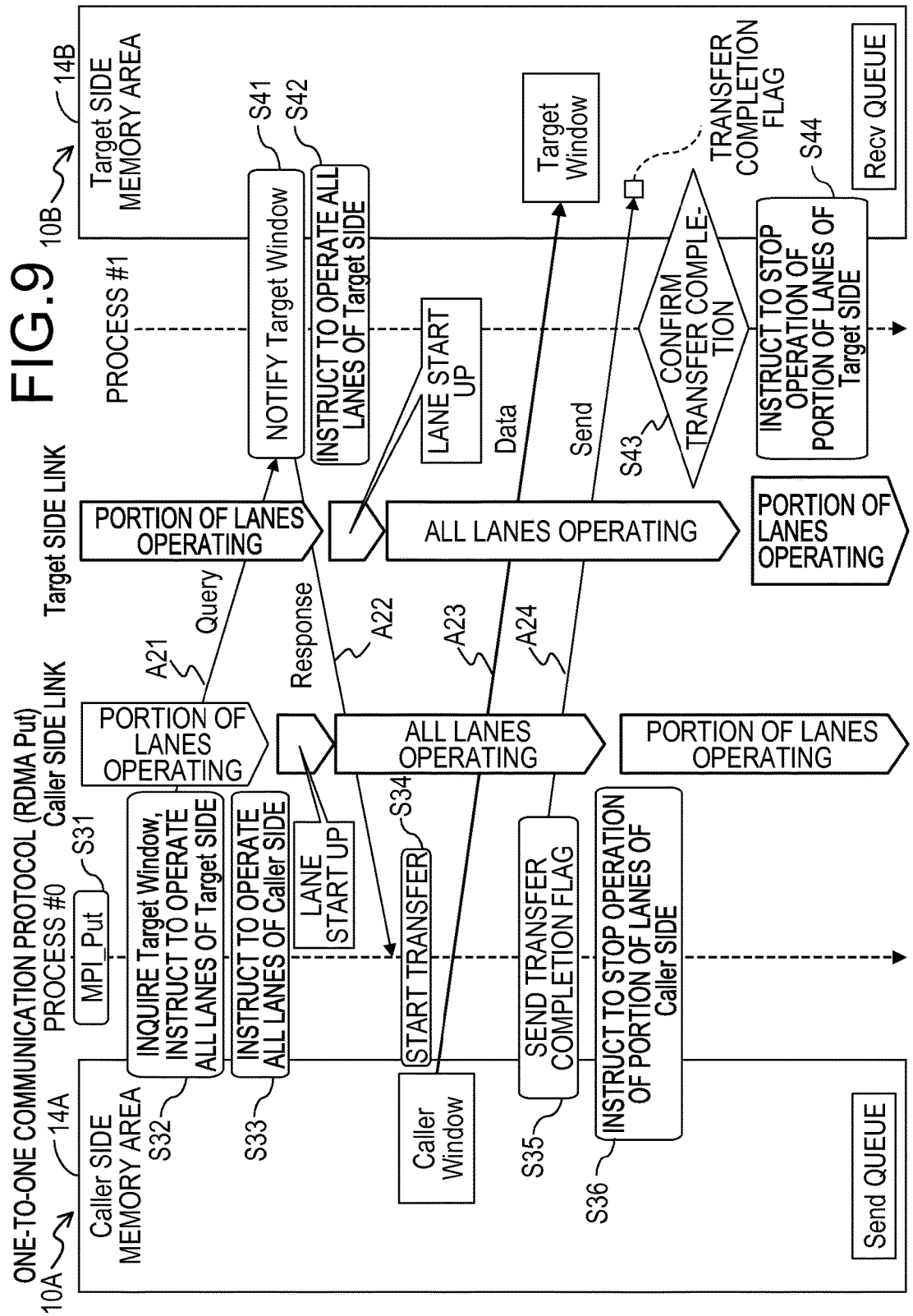

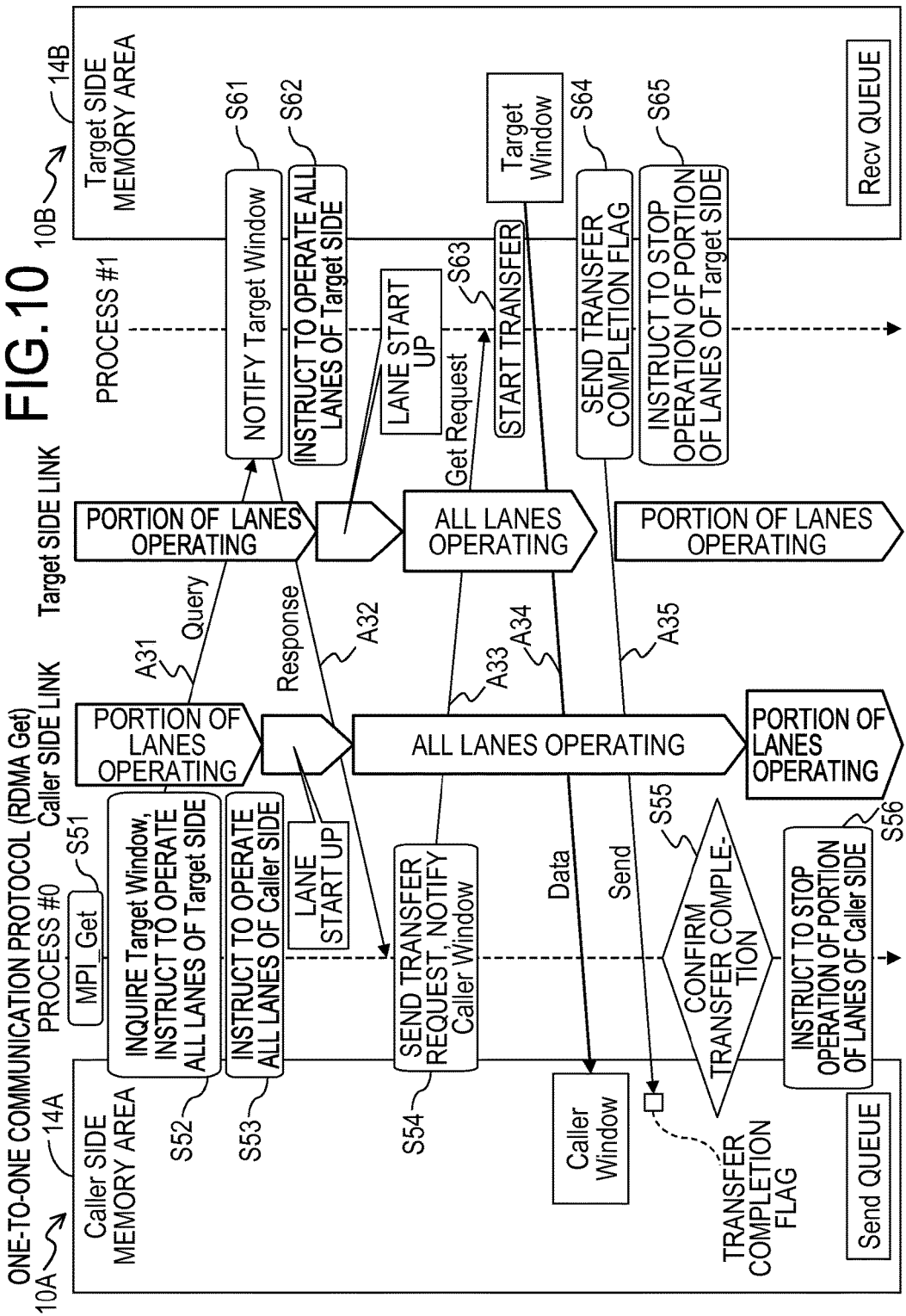

APPARATUS AND METHOD FOR CONTROLLING THE NUMBER OF LANES USED FOR TRANSFERRING DATA BETWEEN INFORMATION PROCESSING APPARATUSES

CROSS-REFERENCE TO RELATED APPLICATION

This application is based upon and claims the benefit of priority from the prior Japanese Patent Application No. 2014-173535 filed on Aug. 28, 2014, the entire contents of which are incorporated herein by reference.

FIELD

The embodiments discussed herein are related to apparatus and method for controlling the number of lanes used for transferring data between information processing apparatuses.

BACKGROUND

A technology is known in which a high speed serial link is used for a connection between nodes of a large-scaled computer. It is known that in a case of a PCI (Peripheral Components Interconnect) Express or 10 GbE (Gigabit Ethernet (registered trademark)), a power consumed by a physical layer of the high speed serial link is an order of 20 mW per 1 Gbps. In the future, in a case where a countermeasure that increases the number of lanes per link is established in order to enhance a link speed, the power consumed by a physical layer of the high speed serial link is increased and becomes non-negligible.

In the large-scaled computer, a program may be executed in which a computation phase of performing a computation after receiving data and a communication phase of transferring the computation result to other node are alternately repeated. In this case, in the computation phase, an idle pattern is sent and received between the node counterparts such that unnecessary electrical power is consumed so as to maintain the established link in the high speed serial link. That is, an operation state is maintained even when a data transfer is not accompanied and thus an electrical power is consumed. When it is intended to suppress the unnecessary power consumption, an operation of the serial link needs to be stopped during the computation phase, but it may take several microseconds for a startup time (activation time) to recover from a stopped state (OFF) to an operation state (ON). Therefore, when the operation of the link is simply stopped, the startup time required for the recovery is added to a communication delay time and a computational efficiency is reduced.

In the meantime, in Japanese Laid-Open Patent Publication No. 2011-123798 or Japanese Laid-Open Patent Publication No. 2011-199361, a technology is disclosed in which the number of lanes is dynamically controlled according to the number or amount of messages that pass through the link per unit time. However, a significant time is required for switching a power supply of the lane from an OFF state to an ON state and thus, even though the number of lanes is dynamically controlled simply according to the number or amount of messages, there is no guarantee that communication may be performed at a timing at which a sufficient bandwidth may be utilized. There may be a case where most of communications have been completed at a time when all the lanes start up. Accordingly, also in Japanese Laid-Open Patent Publication No. 2011-123798 or Japanese Laid-Open Patent Publication No. 2011-199361, when the operation of the link is simply stopped, the startup time taken for the recovery is added to the communication delay time and the computational efficiency is reduced.

In Japanese Laid-Open Patent Publication No. 2010-283696, a technology in which the number of lanes is changed according to a connection communication protocol. This is because the number or amount of communications in a connectionless protocol such as a SNMP (Simple Network Management protocol) or ARP (Address Resolution Protocol) does not influence on the variation of the number of lanes. The number of lanes varies according to a data size used by an application. However, the turn ON/OFF time (startup time) of the power supply of the lane is not considered in the Publication No. 2010-283696. Accordingly, also in Japanese Laid-Open Patent Publication No. 2010-283696, when the operation of the link is simply stopped, the startup time taken for the recovery is added to the communication delay time and the computational efficiency is reduced.

In Japanese National Publication of International Patent Application No. 2008-547362, a technology in which increase or decrease of a link speed or a link bandwidth is dynamically negotiated in response to a command under a software control, but the turn ON/OFF time (startup time) of the power supply of the lane (startup time) is not considered. Accordingly, also in Japanese National Publication of International Patent Application No. 2008-547362, when the operation of the link is simply stopped, the startup time taken for the recovery is added to the communication delay time and the computational efficiency is reduced.

Related technologies are disclosed in, for example, Japanese Laid-Open Patent Publication No. 2011-123798, Japanese Laid-Open Patent Publication No. 2011-199361, Japanese Laid-Open Patent Publication No. 2010-283696, and Japanese National Publication of International Patent Application No. 2008-547362.

SUMMARY

According to an aspect of the invention, an information processing system includes first and second apparatuses that are connected with each other through a communication path provided with a plurality of lanes used for transferring data between the first and second apparatuses. The first apparatus detects transfer-control information prior to data transfer that transfers data between the first and second apparatuses, where the transfer-control information is exchanged, prior to the data transfer, between the first and second apparatuses, according to a predetermined communication protocol. The first apparatus notifies the second apparatus of a lane-control instruction to increase a second lane-counter indicating a number of lanes used by the second apparatus, and increases a first lane-counter indicating a number of lanes used by the first apparatus so that the first lane-counter is greater than a number of lanes that have been used when detecting the transfer-control information. The second apparatus, upon detecting the lane-control instruction notified from the first apparatus, increases the second lane-counter so that the second lane-counter is greater than a number of lanes that have been used when detecting the instruction.

The object and advantages of the invention will be realized and attained by means of the elements and combinations particularly pointed out in the claims. It is to be understood that both the foregoing general description and

BRIEF DESCRIPTION OF DRAWINGS

FIG. 8 is a diagram illustrating an example of an operational sequence for an information processing apparatus when a one-to-one communication protocol is Rendezvous Send/Recv, according to an embodiment;

FIG. 9 is a diagram illustrating an example of an operational sequence for an information processing apparatus when a one-to-one communication protocol is RDMA Put, according to an embodiment; and FIG. 10 is a diagram illustrating an example of an operational sequence for an information processing apparatus when a one-to-one communication protocol is RDMA Get, according to an embodiment.

DESCRIPTION OF EMBODIMENTS

Figure 1:
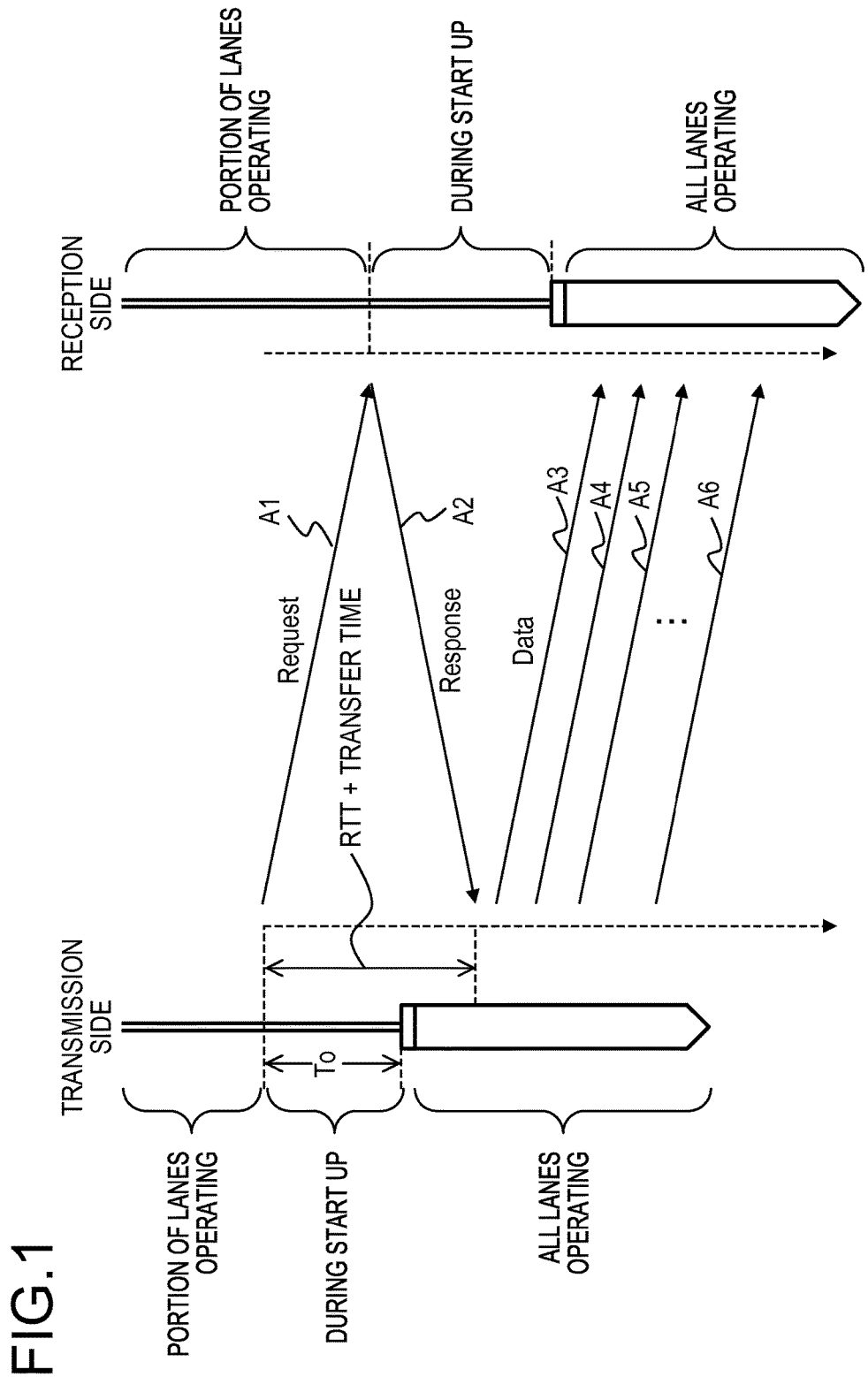
FIG. 1 is a diagram illustrating an example of a communication pattern and a lane startup time in an information processing system, according to an embodiment.

As having been described above, one of the problems to be solved in a large-scaled computer is to reduce the power consumption of the entire system by reducing the electrical power consumed by the high speed serial link without causing a reduction of the computational efficiency in the large-scaled computer.

Hereinafter, descriptions will be made on embodiments of an information processing system, an information processing apparatus, and a control method of the information processing system of the present disclosure in detail with reference to accompanied drawings. However, embodiments to be described in the following are illustrative only and it is not intended to exclude application of various modifications and technologies that are not explicitly described in the embodiments thereto. That is, various modifications may be made to the embodiment without departing from a technical sprit and scope of the present disclosure. Further, it is not to be understood that only the constitutional elements illustrated in each drawing are included in the drawing, and other functions may be included therein. Also, respective embodiments may be appropriately combined in a range without causing inconsistency in processing contents.

[1] Summary

In a large-scaled computer, when the power supplies of some lanes of the link having a plurality of lanes are made to become the OFF state (a state where the bandwidth is throttled), the power consumption is reduced. However, since it takes a significant time for a startup (activation) in which the power supply of the lane is switched from the OFF state to the ON state, the efficiency of a data transfer for which a bandwidth is required may be reduced. In the embodiment, the startup of the lane is performed using a time period during which information needed for the data transfer is acquired before a data transfer is started such that the startup time of the lane is concealed, as will be described with reference to FIG. 1 by noticing a communication pattern such as the Rendezvous Send/Recv or RDMA (Remote Direct Memory Access). Accordingly, adding the startup time of the lane to a communication delay time of a data body is suppressed such that the data body may be transferred using a sufficient bandwidth. Therefore, the power consumption of the entire information processing system may be reduced without causing a reduction of the computational efficiency.

In a general communication pattern (a communication model), transmitting and receiving a relatively lightweight message is frequently performed before a sufficiently large message (data) is transferred. By noticing the communication pattern described above, a power control may be performed more efficiently than in a case where the power control is performed simply based on the number or amount of messages.

Accordingly, the embodiment targets a communication pattern in which a lightweight message is communicated before a relatively long message is transferred. The one-to-one communication protocols corresponding to the communication pattern described above may include, for example, the Rendezvous Send/Recv, the RDMA Put, and the RDMA Get. A configuration is disclosed in the following in which the number of lanes used for communication, that is, the communication speed is controlled at the time when the communication pattern is executed so as to reduce the power consumption. In particular, the embodiment is provided with a function of issuing an instruction to change the number of lanes used for the communication, for example, in a case where the application detects a communication pattern corresponding to the one-to-one communication protocols as described above.

Here, descriptions will be made on a communication pattern and concealment of a startup time of lanes in more detail with reference to FIG. 1. In the meantime, FIG. 1 is a diagram for explaining a communication model (a communication pattern) and a lane startup time in an information processing system to which the embodiment is applied.

In the communication pattern to which the embodiment is applied, as illustrated in FIG. 1, communications (arrows A1 and A2) for a lightweight message ("Request", "Response") are performed before transferring a relatively long message ("Data") (see, e.g., arrow A3). The lightweight message is a message for exchanging information required for transferring a data body between a transmission node and a reception node. Hereinafter, information required for transferring a data body will be also referred to as "transfer-control information". The exchange of the lightweight message is executed in a state where the power supplies of a portion of lanes (some lanes) are turned OFF, that is, only some of the lanes are in an operation state. In this case, the exchange of the message ("Request", "Response") having a small quantity of data is executed in a state where only a portion of lanes are in an operation state (some lanes operating state) without any problem. However, when the data body (Data) having a large quantity of data is transferred in the portion of lanes that are in an operation state, the transfer efficiency is reduced.

When it is possible to activate the some lanes being in the powered-OFF state during an exchanging period of the lightweight message ("Request", "Response") before the data body is transferred, the data transfer is able to be started in a state where the entire lanes (all lanes) are in an operation state (all lanes operating state) and thus, the reduction of the transfer efficiency is not caused.

In the embodiment, it is assumed that a time (a startup time) "To" taken for the startup of a lane is acquired in advance as a specification of the lane. As illustrated in FIG. 1, it is assumed that an instruction to start up a portion of lanes is issued concurrently with a transmission start of the lightweight message (see, e.g., "Request" of arrow A1). In this case, in the transmission side (a transmission node), a time taken from the transmission start of the lightweight message before a response (see, e.g., "Response" of arrow A2) to the lightweight message is received becomes the "RTT plus transfer time." Here, the RTT is an abbreviation of Round Trip Time and corresponds to a round-trip delay time between a transmission side (a transmission node) and a reception side (a reception node). Further, the transfer time is obtained by dividing a transfer time for the lightweight message, that is, a data amount of the lightweight message, by a communication speed.

Accordingly, as illustrated in FIG. 1, when the lane startup time "To" is less than a total value of the RTT and the transfer time, that is, "RTT plus transfer time", the startup time "To" of the lane is concealed by the exchange (transmission and reception) of the lightweight message. In the embodiment, when the communication pattern corresponds to a communication protocol in which the exchange of a lightweight message is followed by the transfer of a data body while the startup time "To" of the lane is less than "RTT plus transfer time," an instruction to startup the entire lanes (an instruction to operate all of the lanes) is issued.

[2] Configuration of the Embodiment

Next, descriptions will be made on functions and a configuration of an information processing system 1 of the embodiment with reference to FIG. 2 to FIG. 5. Descriptions will be made first on basic functions of the information processing system 1, and a hardware configuration and software configuration of each node 10 of the embodiment, with reference to FIG. 2 and FIG. 3.

Figure 2:
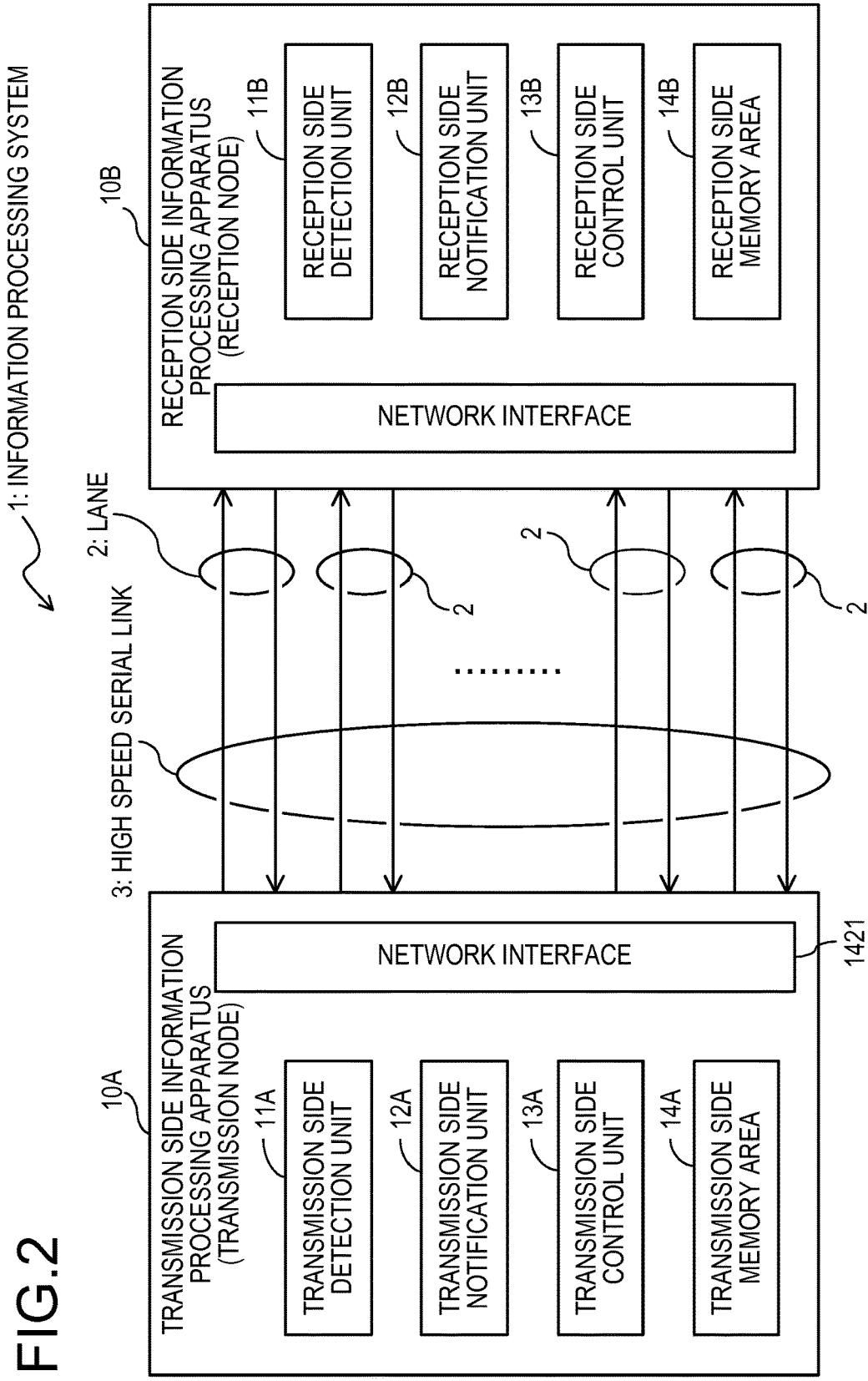
FIG. 2 is a diagram illustrating an example of basic functions of an information processing system, according to an embodiment.

FIG. 2 illustrates the basic configuration of the information processing system 1, that is, the information processing system 1 provided with two information processing apparatuses 10. One of the two information processing apparatuses 10 is a transmission side information processing apparatus and the other is a reception side information processing apparatus. The transmission side information processing apparatus is denoted by a reference numeral 10A and the reception side information processing apparatus is denoted by a reference numeral 10B. An information processing apparatus may be denoted by a reference numeral 10. Each information processing apparatus is, for example, a node (e.g., server and computer) constituting the large-scaled computer and may be referred to as a node 10, a computation node 10, a transmission node 10A, or a reception node 10B.

In FIG. 2, only the functions (reference numerals 11A, 12A, 13A, and 14A) required for a transmission process are illustrated for the transmission node 10A and only the functions (reference numeral 11B, 12B, 13B, and 14B) required for a reception process are illustrated for the reception node 10B. However, each node may have both functionalities required for the transmission process and the reception process.

Figure 4:
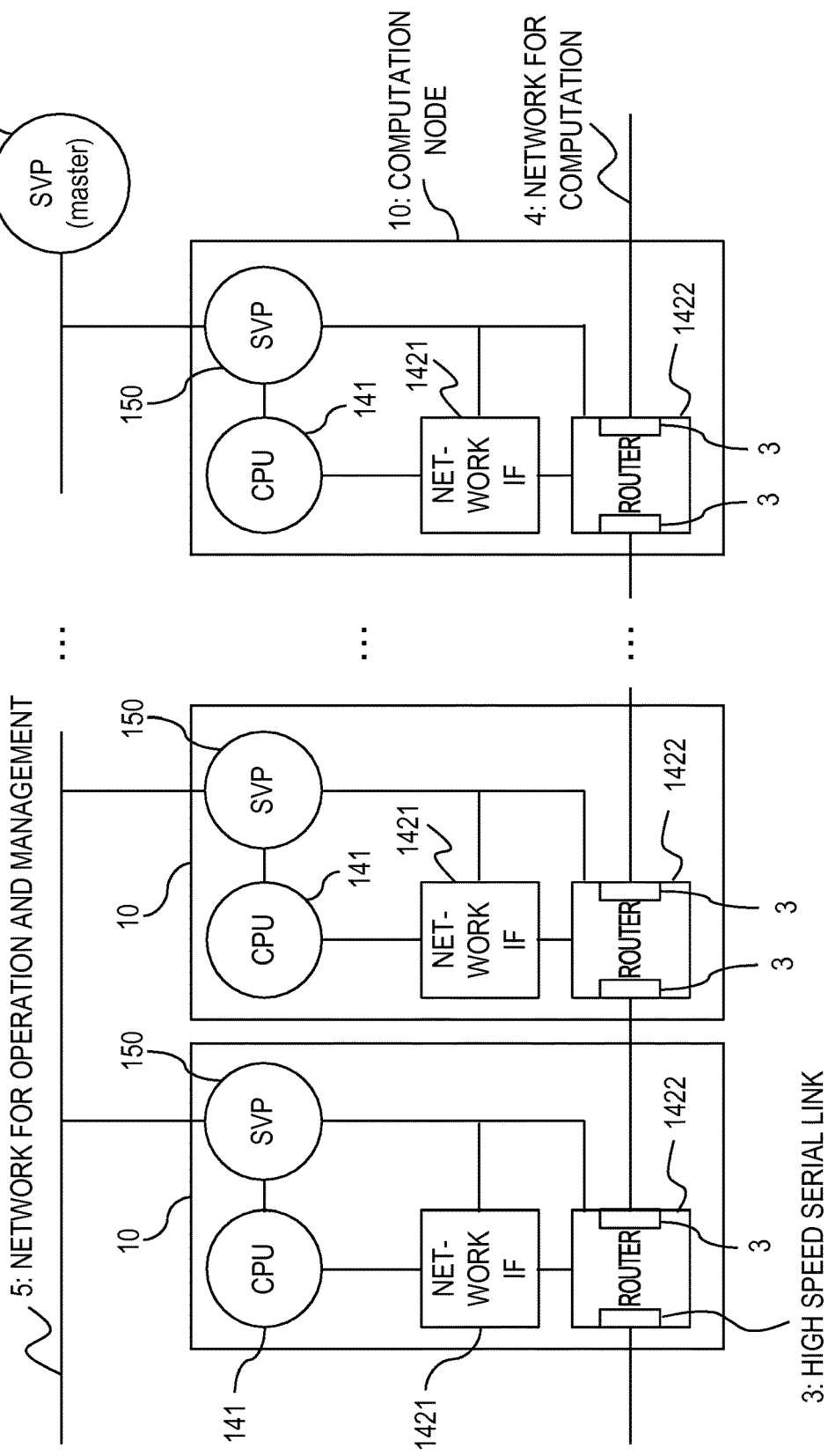
FIG. 4 is a diagram illustrating an example of a configuration of the information processing system in which one or more nodes are disposed between a transmission node and a reception node (a direct network), according to an embodiment.
Figure 5:
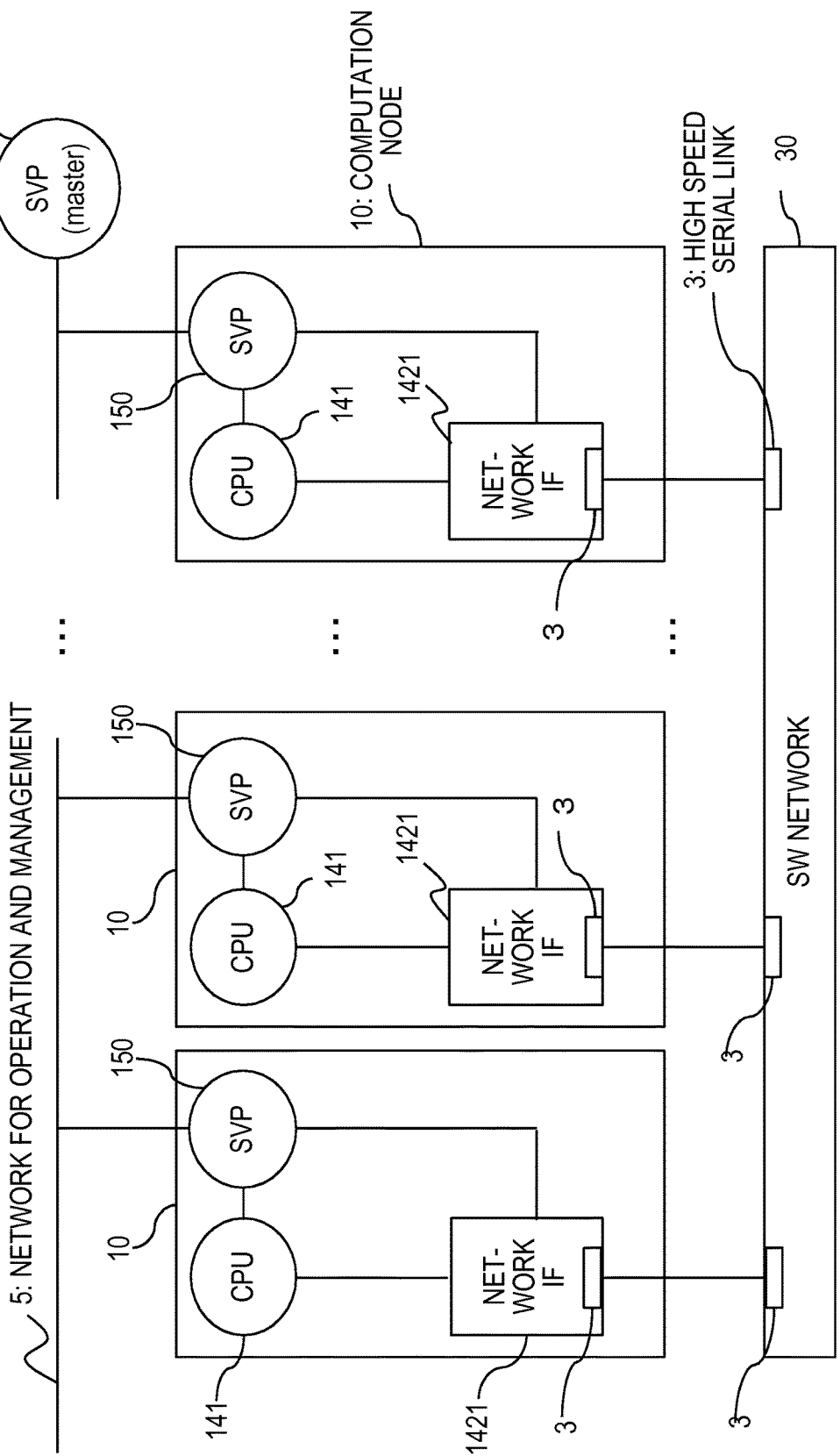
FIG. 5 is a diagram illustrating an example of a configuration of an information processing system in which one or more nodes are disposed between a transmission node and a reception node (an indirect network), according to an embodiment.

In the information processing system 1 illustrated in FIG. 2, two nodes directly connected with each other, that is, the transmission node 10A and the reception node 10B are illustrated. However, the transmission node 10A and the reception node 10B may be two nodes within three or more nodes 10 constituting the information processing system 1, for example, as illustrated in FIG. 4 or FIG. 5, and one or more nodes 10 may be disposed between the transmission node 10A and the reception node 10B.

The transmission node 10A and the reception node 10B are connected with each other through an interconnect 142 (see, e.g., FIG. 3) as a communication path including a plurality of lanes 2. Each lane 2 includes a pair of differential signals for transmitting and receiving a signal (two signal lines) and performs the differential transmission. The differential transmission is a transmission scheme in which a single signal is transmitted over two signal lines, is more resistant to noise, and is able to make a higher signal frequency as compared to a single end transmission in which signal is transmitted over a single signal line. The transmission node 10A and the reception node 10B are connected by a high speed serial link (may be simply referred to as a link) 3 which is a communication path formed by binding a plurality of lanes 2. The plurality of lanes 2 may be bound to obtain a communication bandwidth required for a data transfer between the transmission node 10A and the reception node 10B.

An ON/OFF state of each lane 2 is able to be individually controlled. The power consumption may be reduced by, for example, either turning OFF the power supplies of hardware (not illustrated) at both end portions of each lane 2 or stopping the operation of input/output drivers (not illustrated) at both end portions of each lane 2. The hardware at both end portions of each lane 2 may be controlled by either a driver (not illustrated) provided directly above the hardware or receiving an instruction sent via the link 3. In particular, in the embodiment, an application 110, a communication library 1221, and a network interface 1421 (see, e.g., FIG. 3), which will be described later, control the link 3 (ON/OFF of each lane 2) according to a model (a communication pattern) for the data transfer. Further, a communication library 1221 or a management software (SVP (Service Processor) 150 of FIG. 4 or FIG. 5) accesses the hardware via the driver of a target link 3 to control the link 3 (ON/OFF of each lane 2).

Figure 3:
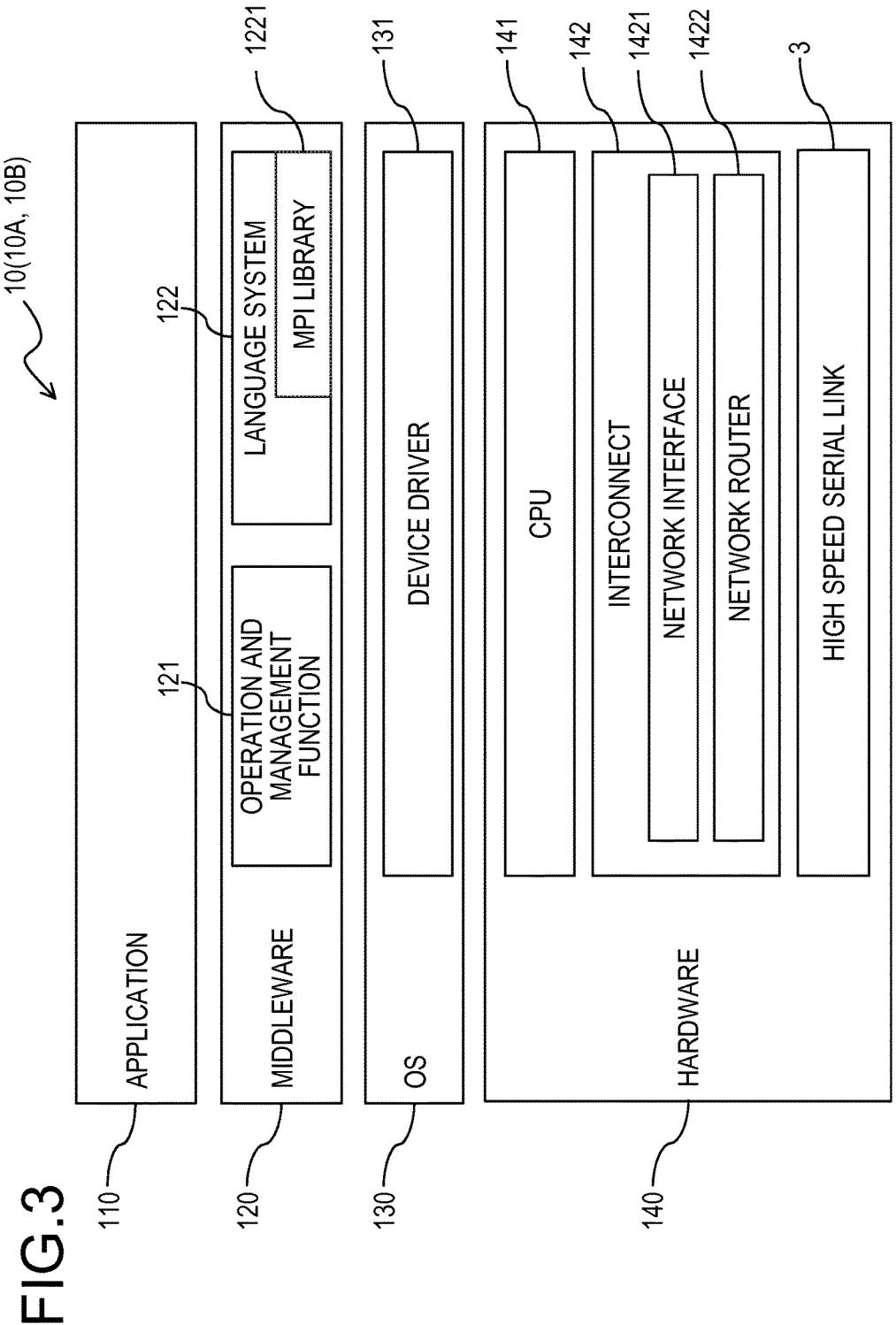
FIG. 3 is a diagram illustrating an example of a hardware configuration and a software configuration of each node (an information processing apparatus) in a information processing system, according to an embodiment.

In each node 10, the end portions of each lane 2 (link 3) are connected to the network interface 1421 (see, e.g., FIG. 2 and FIG. 3). The network interface 1421 is included in the hardware 140 (see, e.g., FIG. 3) of each node 10. The network interface 1421 has a specification for transmitting information from the upper-level software (see, e.g., the application 110 of FIG. 3) to a network (link 3). Further, the network interface 1421 has a specification for receiving information to be directed from the network (e.g., the link 3) to the upper-level software (e.g., the application 110). The network interface 1421 may control the operation state (e.g., ON/OFF state) of each lane 2 of the link 3 accommodated by the network interface 1421.

Here, illustrated in FIG. 3, the application 110, a middleware 120, and an OS (Operating System) 130 are running on the hardware 140 in each node 10. An operation and management function 121 and a language system 122 including an MPI (Message Passing Interface) library 1221 are included in the middleware 120. A device driver 131 for various devices is included in the OS 130. A CPU (Central Processing Unit) 141, the interconnect 142, and the high speed serial link 3 as described above are included in the hardware 140. The network interface 1421 described above and a network router 1422 to be described later are included in the interconnect 142 (see FIG. 4).

Here, the MPI library 1221 may refer to a communication library equipped with the MPI. The MPI is a standard for transmitting and receiving information between processes on a plurality of nodes 10 in a decentralized memory type computer. In the MPI, the transmission and reception counterparts are explicitly designated. Further, the MPI changes a call requested from the application 110 into a communication descriptor to be inserted into a queue (see, e.g., FIG. 8 to FIG. 10). In a case where, for example, the MPI is adapted to be set such that the completion of data transfer is notified to the application 110, the MPI detects and notifies the completion of data transfer to the application 110, by reading the notification or a transfer completion flag from the network interface 1421.

The queue is a memory area secured in the memory areas 14A and 14B to be described later and used for transmitting and receiving the communication descriptor between the upper-level software (application) 110 and the network interface 1421. The queue is a FIFO (First-In First-Out). A Send queue and a Recv (Receive) queue exist as a queue. One or more queues (see, e.g., the Send queue of FIG. 8 to FIG. 10) exist in a transmission side memory area 14A between a transmission side process (see, e.g., process #0 of FIG. 8 to FIG. 10) of the upper-level software 110 and the network interface 1421. Further, one or more queues (see, e.g., the Recv queue of FIG. 8 to FIG. 10) exist in a reception side memory area 14B between a reception side process (see, e.g., process #1 of FIG. 8 to FIG. 10) of the upper-level software 110 and the network interface 1421. The Send queue and the Recv queue are independent queues.

The communication descriptor is an indicator which indicates any one of a transmission instruction from the upper-level software 110 to the network interface 1421 and a reception completion notification directing from the network interface 1421 to the upper-level software 110. The transmission instruction is inserted in the Send queue allocated for the network interface 1421. The reception completion notification is inserted into the Receive queue allocated for the process when the received information is normal.

Next, descriptions will be made on an example of a configuration of the information processing system 1 in which one or more nodes 10 are disposed between the transmission node 10A and the reception node 10B with reference to FIG. 4 (a direct network). Each computation node 10 of the information processing system 1 illustrated in FIG. 4 includes the CPU 141, the network interface 1421, a network router 1422, and the SVP (slave) 150. The SVP 150 executes the management software to manage the CPU 141, the network interface 1421, and the network router 1422 within the computation node 10. The SVP 150 of each computation node 10 is connected to a SVP (master) 20 through a network 5 for operation and management and is collectively managed by the SVP 20. In the information processing system 1 illustrated in FIG. 4, the routers 1422 of adjacent computation nodes 10 are connected with each other through the high speed serial link 3 such that the adjacent computation nodes 10 are directly connected with each other (a direct network). Among the plurality of computation nodes 10 directly connected with each other, the computation nodes 10 at the end portions are connected to a network 4 for computation through the high speed serial link 3. In the meantime, even though each computation node 10 is provided with the SVP 150 in FIG. 4, a single SVP 150 may be provided per two or more computation nodes 10.

Further, descriptions will be made on an example of a configuration of the information processing system 1 in which one or more nodes 10 are disposed between the transmission node 10A and the reception node 10B with reference to FIG. 5 (an indirect network). Each computation node 10 of the information processing system 1 illustrated in FIG. 5 includes the same components CPU 141, network interface 1421, SVP 150, as those of the information processing system 1 illustrated in FIG. 4. However, in the information processing system 1 illustrated in FIG. 5, the network interface 1421 of each computation node 10 is connected to a SW (switch) network 30 through the high speed serial link 3 such that the plurality of computation nodes 10 are indirectly connected with each other (an indirect network). In the meantime, even though each computation node 10 is provided with the SVP 150 in FIG. 5, a single SVP 150 may be provided per two or more computation nodes 10.

Next, descriptions will be made on functions for the transmission process at the transmission node 10A and functions for the reception process at the reception node 10B in the information processing system 1 of the embodiment with reference to FIG. 2

The transmission node 10A is provided with functions of a transmission side detection unit 11A, a transmission side notification unit 12A, and a transmission side control unit 13A. The functions of the transmission side detection unit 11A, the transmission side notification unit 12A, and the transmission side control unit 13A may be implemented by executing a predetermined program in, for example, the CPU 141, the SVP 150, or the network interface 1421 illustrated in FIG. 4 or FIG. 5. Further, a transmission side memory area 14A is secured in a memory, such as a HDD (Hard Disk Drive), a SSD (Solid State Drive), or a RAM (Random Access Memory), in the transmission node 10A.

Similarly, the reception node 10B is provided with functions of a reception side detection unit 11B, a reception side notification unit 12B, and a reception side control unit 13B. The functions of the reception side detection unit 11B, the reception side notification unit 12B, and the reception side control unit 13B may be implemented by executing the predetermined program in, for example, the CPU 141, the SVP 150, or the network interface 1421 illustrated in FIG. 4 or FIG. 5. Further, a reception side memory area 14B is secured in a memory, such as a HDD (Hard Disk Drive), a SSD (Solid State Drive), or a RAM (Random Access Memory), in the transmission node 10A.

In the meantime, the predetermined program is provided in a form of being recorded in a computer readable recording medium, such as a flexible disk, a CD (e.g., CD-ROM, CD-R, and CD-RW), a DVD (e.g., DVD-ROM, DVD-RAM, DVD-R, DVD-RW, DVD+R, and DVD+RW), or a blue-ray disk. In this case, each node 10 uses the predetermined program by reading the program from the computer readable recording medium and transferring the program to a storing unit, as an internal storage device or external storage device, or the above-mentioned memory so as to be stored therein.

The functions of the transmission side detection unit 11A, the transmission side notification unit 12A, and the transmission side control unit 13A in the transmission node 10A are as follows.

The transmission side detection unit 11A detects transfer-control information required for a data transfer of data, which is to be transmitted to the reception node 10B prior to the data transfer between the transmission node 10A and the reception node 10B. That is, the transmission side detection unit 11A determines whether the communication pattern corresponds to a communication protocol in which a lightweight message (information of transfer) is communicated before a relatively long data is transferred, at the time when the transmission node 10A starts transmitting. In this case, the transmission side detection unit 11A may determine whether any one of, for example, Rendezvous Send/Recv, RDMA Put, and RDMA Get is used as the one-to-one communication protocol so as to detect the lightweight message.

Further, the transmission side detection unit 11A also determines whether the startup of the lane 2 may be concealed by the communication of the lightweight message. That is, as described above with reference to FIG. 1, the transmission side detection unit 11A calculates a transfer time for the lightweight message and determines whether the known startup time "To" of the lane 2 is less than a total value of the known RTT and the calculated transfer time.

Further, the transmission side detection unit 11A is provided with a function of detecting a response from the reception node 10B for the lightweight message or the completion of transfer (a transfer completion flag) from the reception node 10B. In a case where the communication protocol is, for example, the Rendezvous Send/Recv or the RDMA Put, when the data transfer to the reception node 10B is completed, the transfer completion is notified from the reception side notification unit 12B as will be described later.

When the transmission side detection unit 11A detects the transmission of the lightweight message (e.g., a predetermined communication pattern), the transmission side notification unit 12A notifies the reception node 10B of an instruction to increase the number of lanes. The instruction to increase the number of lanes is an instruction to cause the number of lanes 2 used for the data transfer to be greater than the number of lanes 2 used for the transmission of the lightweight message. In a case where the size of data to be transferred is large when the application 110 performs a one-to-one communication using the MPI, it is preferable that the entire lanes 2 of the link 3 in the data transfer path are enabled. Accordingly, in the embodiment, the operations of a portion of the lanes 2 are stopped (a power OFF state) to allow other lanes 2 to be enabled (a power ON state) at the time of the lightweight message transmission, while the entire lanes 2 is allowed to be in the operation state (power ON) at the time of the data transfer. Therefore, hereinafter, the instruction to increase the number of lanes is referred to as an instruction to operate the entire lanes.

Further, the transmission side notification unit 12A has a function of notifying the reception node 10B of an instruction to operate the entire lanes by appending the instruction to the lightweight message. In the meantime, for example, a field used for designating the instruction to operate the entire lanes is added in the communication descriptor by the MPI in order to allow the application 110 to issue the message in which the instruction to operate the entire lanes is added. In the field, a following item used for indicating the instruction to operate the entire lanes is added. For example, the number "1" is set in the field for a case where the instruction to operate the entire lanes is intended to be issued, while the number "0" is set in the field for a case where the instruction to operate the entire lanes is not intended to be issued, that is, the instruction to stop the operation of a portion of the lanes is intended to be issued. The MPI inserts the communication descriptor into a queue of the transmission side memory area 14A as described above. When the number "1" is set in the field, the transmission side notification unit 12A appends the instruction to operate the entire lanes to the lightweight message so as to be notified to the reception node 10B.

Further, when the transmission node 10A completes the data transfer to the reception node 10B (in a case where the communication protocol is, for example, the Rendezvous Send/Recv or the RDMA Put), the transmission side notification unit 12A also has a function of notifying the reception node 10B of the transfer completion (e.g., notifying a transfer completion flag). In this case, it is preferable that the transmission side notification unit 12A notifies the transfer completion flag along with the instruction to stop the operation of a portion of the lanes with respect to the reception node 10B.

When the transmission side detection unit 11A detects the above-mentioned message transmission (e.g., detecting a predetermined communication pattern), the transmission side control unit 13A issues an instruction to operate the entire lanes (an instruction to increase the number of the lanes, instruction to start up the entire lanes) so as to cause the number of lanes 2 used for the data transfer to be greater than the number of the lanes 2 used for the lightweight message transmission, in the transmission node 10A. Accordingly, in the embodiment, the operation state of the link 3 switches from a state where the operation of a portion of the lanes 2 is stopped to a state (startup state) where the entire lanes 2 are being operated, that is, a state where the bandwidth for the lanes is widened as described above.

Further, when the transmission node 10A has completed the data transfer to the reception node 10B or the transmission side detection unit 11A detects the transfer completion flag from the reception node 10B, the transmission side control unit 13A issues an instruction to decrease the number of lanes in the transmission node 10A. The instruction to decrease the number of lanes is an instruction to decrease the number of the lanes 2 to be used for the communication after the data transfer has been completed. In the embodiment, the entire lanes 2 is in an operation state (a power ON state) during the data transfer, and in a case (e.g., during the lightweight message transmission) other than during the data transfer, the operation of the remaining lanes except for the portion of the lanes 2 are made to stop in order to allow only a portion of the lanes 2 to be used. Accordingly, hereinafter, the instruction to decrease the number of lanes is referred to as an instruction to stop the operation of the portion of the lanes. When the transmission side control unit 13A issues the instruction to stop the operation of the portion of the lanes, the operation state of the link 3 switches from the state where the entire lanes 2 is being operated to a state where the operation of the portion of the lanes is stopped. Hereinafter, an instruction to increase or decrease the number of lanes will be also referred to as "a lane-control instruction".

In the meantime, the transmission side memory area 14A is used as a Send side memory area illustrated in FIG. 8 or a Caller side memory area illustrated in FIG. 9 and FIG. 10.

In the transmission side memory area 14A, areas for, for example, a Send Buffer, a Caller Window, a Send queue, and a transfer completion flag are secured as needed as illustrated in FIG. 8 to FIG. 10.

In the meantime, the functions as the reception side detection unit 11B, the reception side notification unit 12B, and the reception side control unit 13B in the reception node 10B are as follows.

The reception side detection unit 11B detects the transfer completion flag from the transmission node 10A in addition to detecting the message containing the instruction to operate the entire lanes from the transmission node 10A by referencing the instruction appended to the message.

When the reception node 10B has completed the data transfer to the transmission node 10A (in a case where the communication protocol is, e.g., the RDAM Get), the reception side notification unit 12B notifies the transmission node 10A of the transfer completion (a transfer completion flag). In this case, it is preferable that the reception side notification unit 12B notifies the transfer completion flag along with the instruction to stop operation of a portion of lanes with respect to the transmission node 10A.

When the reception side detection unit 11B detects an instruction to operate the entire lanes, the reception side control unit 13B issues the instruction to operate the entire lanes (an instruction to increase the number of lanes, and an instruction to start up the entire lanes) so as to cause the number of lanes 2 used for the data transfer to be greater than the number of lanes 2 used for the lightweight message transmission in the reception node 10A. Accordingly, in the embodiment, the operation state of the link 3 switches from the state where the operation of a portion of the lanes 2 is stopped to the state (startup state) where the entire lanes 2 is being operated Further, when the reception node 10B has completed the data transfer to the transmission node 10A or the reception side detection unit 11B detects the transfer completion flag from the transmission node 10A, the reception side control unit 13B issues the instruction to stop the operation of a portion of the lanes in the reception node 10B. Accordingly, the operation state of the link 3 switches from a state where the entire lanes 2 is being operated to a state where the operation of a portion of the lanes 2 is stopped in the reception node 10B and the number of lanes 2 to be used for the communication after the data transfer has been completed is caused to be smaller than the number of the lanes 2 to be used for the data transfer.

The reception side memory area 14B is used as a Recv side memory area illustrated in FIG. 8 or a Target side memory area illustrated in FIG. 9 and FIG. 10. In the reception side memory area 14B, areas for, for example, a Recv Buffer, a Target Window), a Recv queue, and a transfer completion flag are secured as needed as illustrated in FIG. 8 to FIG. 10.

Hereinafter, descriptions will be made on a technology relating to a configuration for implementing various functions (e.g., functions as Transmission side detection unit 11A, Transmission side notification unit 12A, Transmission side control unit 13A, Reception side detection unit 11B, Reception side notification unit 12B, and Reception side control unit 13B) described above in each node 10 of the embodiment.

Regarding a structure for controlling operation state of the lane 2:

A hardware itself, a firmware of a device equipped with the hardware, or a device driver which controls the device may control the power supply of each lane 2 or the operation of the input/output driver of each lane 2. The firmware or the device driver is controlled by an upper-level software such as the MPI library 1221. The application 110 outputs a lane operation instruction to a single or a plurality of upper-level software.

Regarding the information processing system 1 (see, e.g., FIG. 4 and FIG. 5) in which one or more nodes 10 are disposed between the transmission node 10A and the reception node 10B: In a situation where data is transferred via one or more nodes 10, when it is intended to change the operation state (ON/OFF) for the lane 2 on the data transfer path, the message to which the instruction to operate the lane 2 is added is transmitted. In a case where the upper-level software or the SVP 150 controls the device (the node 10) which includes the lane 2, when the message to which the lane control instruction is added is received in the node 10 via which data is transferred, the instruction to change operation of the lane is output to the firmware or the device driver 131. Otherwise, in a case where the upper-level software or the SVP 150 does not control the node 10, that is, in a case where the hardware 140 (the router 1422) transfers the received contents as it is, when the router 1422 receives the message to which the lane control instruction is added, the firmware or the hardware 130 changes the operation state of the lane 2.

Regarding the network interface 1421: The network interface 1421 is provided with a function of receiving a transmission request from the upper-level software to deliver the message or data of the memory area 14A and 14B to network. Here, the network is not limited to a specific network, but may be, for example, the Ethernet (registered trademark), the InfiniBand (registered trademark), or the Myrinet (registered trademark). The network interface 1421 extracts the communication descriptor sequentially from the Send queue. In a case where the number "1" is set in a field for the instruction to operate the entire lanes of the extracted communication descriptor and the communication protocol is one of the Rendezvous Send/Recv, the RDMA Put, and the RDMA Get, the network interface 1421 issues an "inquiry" message ("Query") to which the instruction to operate the entire lanes is appended. In the meantime, when it is intended to transmit the transmission completion flag or the transfer completion flag after the data transfer accompanied by the instruction to operate the entire lanes, the network interface 1421 may append the instruction to stop operation of a portion of lanes to the flag. The processing of transmitting the flag by appending the instruction to stop operation of a portion of lanes thereto is executed at a Send side of Rendezvous Send/Recv (see, e.g., FIG. 8), a Caller side of RDMA Put (see, e.g., FIG. 9), or a Target side of RDMA Get (see, e.g., FIG. 10).

Regarding a configuration common to both the transmission side (the transmission node 10A) and the reception side (the reception node 10B): Upper level hardware or software on which the link 3 is disposed may individually control each lane 2 of the link 3 through a control signal line (not illustrated). The upper level hardware or software exists as a portion of the network interface 1421.

Regarding a configuration of the transmission side (see, e.g., the Transmission side or Caller side in FIG. 8 to FIG. 10): In the transmission node 10A, when a message transmission request (a communication descriptor) is received from the upper-level software which includes the MPI and "1" is set in the field for the instruction to operate the entire lanes of the communication descriptor, the message to which the instruction to operate the entire lanes is appended is sent.

Thereafter, the state of the entire lanes 2 of the link 3 over which the message is delivered is switched to an operation state.

Regarding a configuration of the reception side (see, e.g., the Reception side or the Target side in FIG. 8 to FIG. 10): In the reception node 10B, when the received message is appended with the instruction to operate the entire lanes and corresponds to the "inquiry" message ("Query") caused by one of the Rendezvous Send/Recv, the RDMA Put, and the RDMA Get, the instruction to operate the entire lanes is applied to the link 3 over which the message is received. The reception node 10B having received the "inquiry" message ("Query") replies a response ("Response") to the transmission node 10A in the same manner as before.

Regarding the network router 1422 or the switch: In the node 10 via which the message propagates, the network router 1422 or the switch transmits a portion of message or data received from a certain link 3 to other link 3 destined to a transfer destination. Here, a link which has received the message is referred to as a reception link and a link used for transferring the message is referred to as a transmission link. During a message is being stayed in a route from the reception link 3 to the transmission link 3, the network interface 1421 may read a lane operation control instruction added to the message. When the read instruction is the instruction to operate the entire lanes, the power supply or the input/output driver for the entire lanes 2 in the reception link 3 and the transmission link 3 is switched to the ON state. Further, when the read instruction is the instruction to stop operation of a portion of lanes, the power supply or the input/output driver for a portion of lanes 2 in the reception link 3 and the transmission link 3 is switched to the OFF state.

As described above, in the embodiment, the instruction to control the operation of the target link 3 on the network is transmitted using the MPI. The program using the MPI inserts the communication descriptor into the Send queue of the MPI (see FIG. 8 to FIG. 10). The communication descriptor includes an instruction (field) to dynamically change the operation state of the lanes. Further, in the embodiment, information of communication instruction is embedded into an initial adjusting packet by the communication protocol of the Rendezvous Send/Recv or the RDMA Put of the MPI. Also, the communication instruction to switch the operation of the lane with respect to all links 3 on the communication path is embedded into the message for the subsequent data communication.

[3] Operation of the Embodiment

Figure 6:
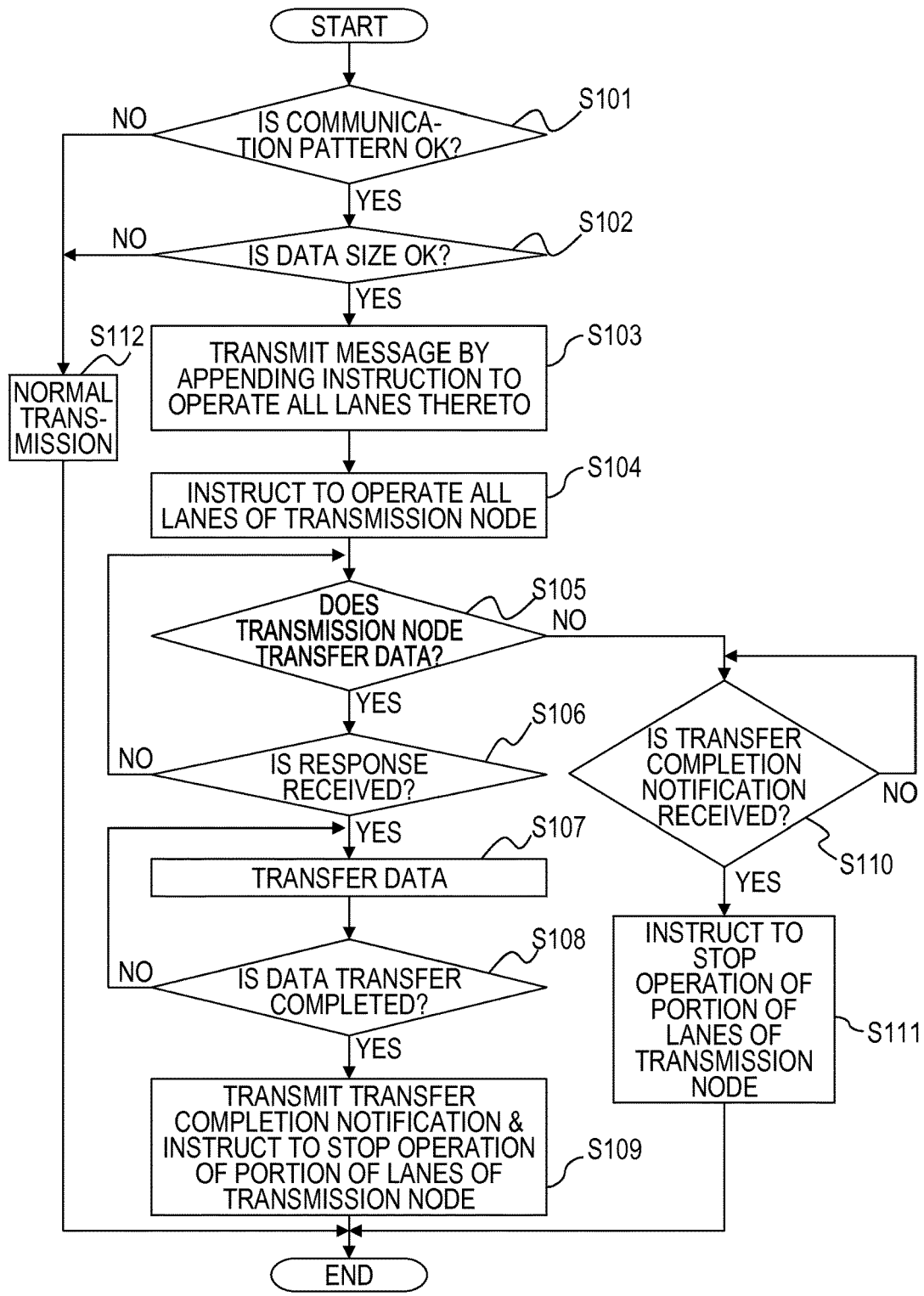
FIG. 6 is a diagram illustrating an example of an operational flowchart for operations of a transmission side information processing apparatus (a transmission node), according to an embodiment.
Figure 7:
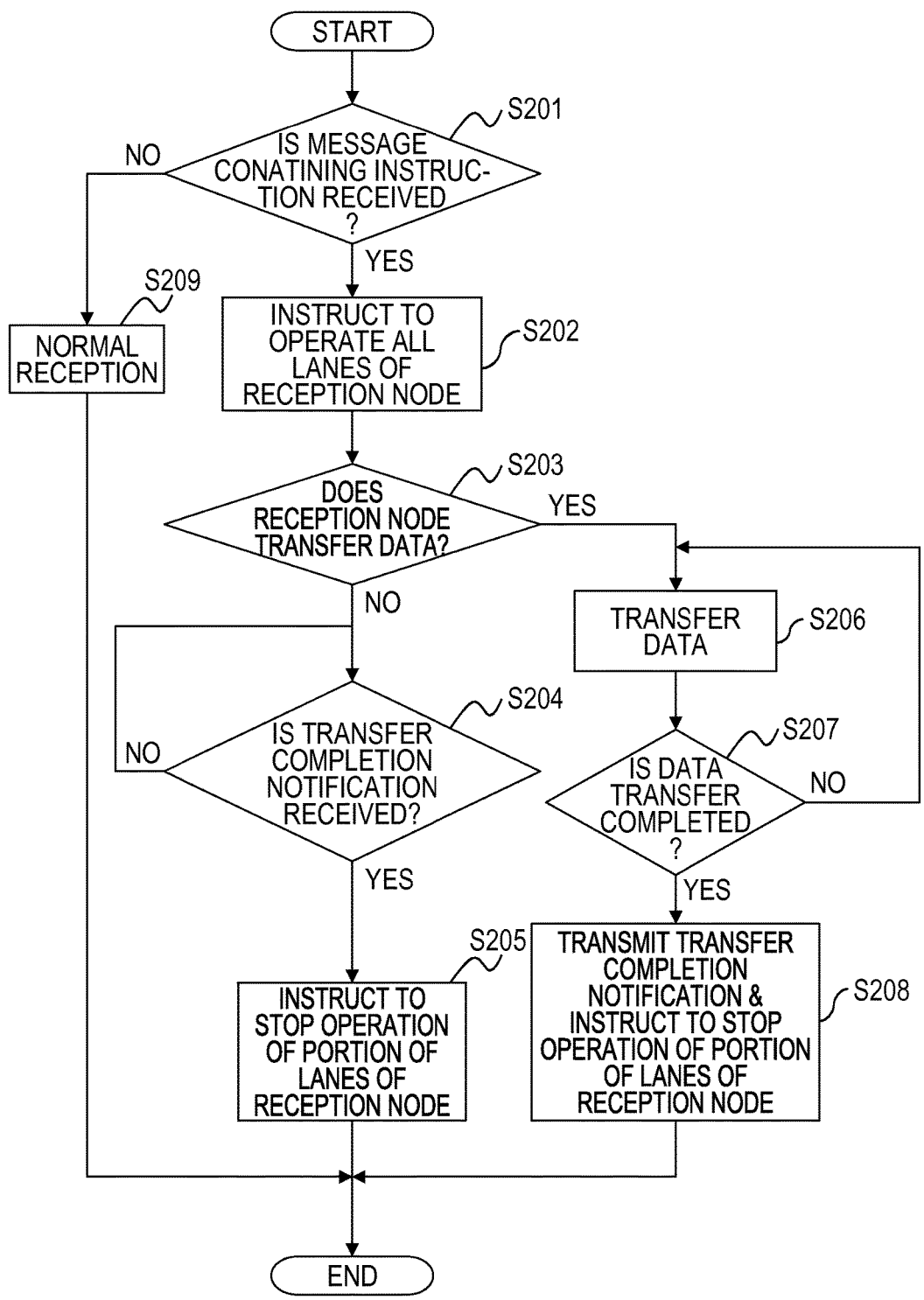
FIG. 7 is a diagram illustrating an example of an operational flowchart for operations of a reception side information processing apparatus (a reception node), according to an embodiment.

Next, descriptions will be made on the operation of the transmission node 10A and the reception node 10B constituting the information processing system 1 according to the embodiment with reference to FIG. 6 and FIG. 7.

Descriptions will be made first on the operation of the transmission node 10A of the embodiment (a transmission side process) according to a flowchart illustrated in FIG. 6 (steps from S101 to S112).

When the transmission node 10A starts communication, the transmission side detection unit 11A first determines whether the current communication is based on a predetermined one-to-one communication protocol (whether the communication pattern is "OK") (step S101). Here, as described above, it is determined whether the communication pattern is "OK" by determining whether one of the Rendezvous Send/Recv, the RDMA Put, and the RDMA Get is used as the one-to-one communication protocol.

When any one of three types of protocols is not being used, it is determined that the communication pattern is "NG" ("NO" route at step S101), and a normal transmission process is executed (step S112). In the meantime, when one of three types of protocols is being used, it is determined that the communication pattern is "OK" ("YES" route at step S101). That is, it is determined that transmitting of the lightweight "inquiry" message to be transmitted to the reception node 10B is performed prior to the data transfer between the transmission node 10A and the reception node 10B.

The transmission side detection unit 11A determines whether the startup of the lanes 2 may be concealed by the communication of "inquiry" message (whether the data size is "OK") (step S102). In this case, the transmission side detection unit 11A calculates a transfer time for "inquiry" message and determines whether the known startup time "To" of the lanes 2 is less than the total value of the known RTT and the calculated transfer time.

When it is determined that the startup time "To" is equal to or greater than the total value, the data size is determined as "NG", that is, it is determined that the startup of the lanes 2 is not able to be concealed by the communication of "inquiry" message ("NO" route at step S102), and the normal transmission process is executed (step S112). In the meantime, when it is determined that the startup time "To" is less than the total value, the data size is determined as "OK", that is, it is determined that the startup of the lanes 2 is able to be concealed by the communication of "inquiry" message ("YES" route at step S102). Also, the transmission side notification unit 12A appends an instruction to operate the entire lanes to the "inquiry" message to be transmitted to the reception node 10B (step S103). Further, the transmission side control unit 13A issues an instruction to operate the entire lanes (step S104) and switches the operation state of the link 3 from a state where a portion of lanes is being stopped to a state where the entire lanes are being operated in the transmission node 10A.

When the communication protocol is the Rendezvous Send/Recv or the RDMA Put, that is, when the transmission node 10A performs the data transfer to the reception node 10B ("YES" route at step S105), the process performed by the transmission node 10A proceeds to step S106. The transmission node 10A waits for a response from Reception node 10B (from "NO" route at step S106 to step S106). When the transmission side detection unit 11A detects the response from the reception node 10B ("YES" route at step S106), the transmission node 10A performs the data transfer to the reception node 10B according to contents of the response from the reception node 10B (step S107). In this case, since the startup of the entire lanes 2 has been completed before the response from the reception node 10B is received, the transmission node 10A is able to perform the data transfer without reducing the operation efficiency.

When the data transfer is started, the transmission node 10A waits until the data transfer is completed (from "NO" route at step S108 to step S107). When it is determined that the data transfer is completed ("YES" route at step S108), the transmission side notification unit 12A notifies the reception node 10B of the completion of the data transfer (transfer completion flag) (step S109). In this case, the transmission side notification unit 12A may transmit an instruction to stop operation of a portion of lanes with respect to the reception while appending the transfer completion flag to the instruction. In the embodiment, the transmission side notification unit 12A is adapted to transmit only the transfer completion flag without transmitting the instruction to stop operation of a portion of lanes and cause the transfer completion flag to function as the instruction to stop operation of a portion of lanes as well.

Further, the transmission side control unit 13A issues an instruction to stop operation of a portion of lanes in the transmission node 10A (step S109) and switches the operation state of the link 3 from a state where the entire lanes 2 is being operated to a state where the operation of a portion of the lanes 2 are being stopped. Thereafter, the transmission node 10A ends the current Transmission side process.

In the meantime, when the communication protocol is the RDMA Get, that is, when data is received from the reception node 10B ("NO" route at step S105), the process performed by the transmission node 10A proceeds to step S110. The transmission node 10A waits until the transfer completion flag indicating that the data transfer from the reception node 10B to the transmission node 10A is completed is received (from "NO" route at step S110 to step S110).

When it is determined that the transmission side detection unit 11A detects the transfer completion flag from the reception node 10B ("YES" route at step S110), the transmission side control unit 13A issues an instruction to stop operation of a portion of lanes (step S111) in the transmission node 10A and switches the operation state of the link 3 from a state where the entire lanes 2 are being operated to a state where a portion of lanes 2 is being stopped. Thereafter, the transmission node 10A ends the current Transmission side process.

Next, descriptions will be made on the operation of the reception node 10B of the embodiment (a Reception side process) according to a flowchart illustrated in FIG. 7 (steps from S201 to S209).

When the reception node 10B starts communication, the reception side detection unit 11B references the instruction appended to the received message first, and determines whether the message appended with the instruction to operate all the lanes is received from the transmission node 10A (step S201). When it is determined that the instruction to operate the entire lanes is not appended to the received message ("NO" route at step S201), the normal transmission process is executed by the reception node 10B (step S209).

When it is determined that the instruction to operate the entire lanes is appended to the received message ("YES" route at step S201), the transmission side control unit 13A issues the instruction to operate the entire lanes in the transmission node 10A (step S202). Accordingly, the operation state of the link 3 is switched from a state where a portion of lanes is being operated to a state where the entire lanes 2 are being operated.

When the communication protocol is the Rendezvous Send/Recv or the RDMA Put, that is, when the transmission node 10A performs the data transfer to the reception node 10B ("NO" route at step S203), the process performed by the reception node 10B proceeds to step S204. The reception node waits until the transfer completion flag indicating that the data transfer from the transmission node 10A to the reception node 10B is completed is received (from "NO" route at step S204 to step S204).

When the reception side detection unit 11B detects the transfer completion flag from the transmission node 10A ("YES" route at step S204), the reception side control unit 13B issues the instruction to stop operation of a portion of lanes in the reception node 10B (step S205). Accordingly, the operation state of the link 3 is switched from a state where the entire lanes are being operated to a state where the operation of the portion of the lanes 2 is stopped. Thereafter, the reception node 10B ends the current Reception side process.

In the meantime, when the communication protocol is the RDMA Get, that is, when the data transfer from the reception node 10B to the transmission node 10A is performed ("YES" route at step S203), the process performed by the reception node 10B proceeds to step S206. At step S206, the reception node 10B transfers data to the transmission node 10A according to the information (see arrow A33 of FIG. 10) acquired from the transmission node 10A.

When the data transfer is started, the reception node 10B waits until the data transfer is completed (from "NO" route at step S207 to step S206). When it is determined that the data transfer is completed ("YES" route at step S207), the reception side notification unit 12B notifies the transmission node 10A of the completion of the data transfer (e.g., notifying a transfer completion flag) (step S208). In this case, the reception side notification unit 12B may transmit an instruction to stop operation of a portion of lanes with respect to the transmission node 10A by appending the transfer completion flag to the instruction to stop operation of the portion of lanes. In the embodiment, the reception side notification unit 12B is adapted to transmit only the transfer completion flag without transmitting an instruction to stop operation of a portion of lanes and allow the transfer completion flag to function as the instruction to stop operation of the portion of lanes as well.

Further, the reception side control unit 13B issues the instruction to stop operation of a portion of lanes in the reception node 10B (step S208) and switches the operation state of the link 3 from a state where the entire lanes 2 are being operated to a state where the operations of a portion of the lanes 2 are stopped. Thereafter, the reception node 10B ends the current Reception side process.

[4] More Particular Operations of the Embodiment

Next, descriptions will be made on more specific operations of the information processing system 1 of the embodiment with reference to FIG. 8 to FIG. 10. As described above, in a case where the size of data to be transferred at the time when the application 110 performs one-to-one communication using the MPI, it is preferable that the entire lanes of the link 3 on the transfer path are enabled. The application 110 is able to issue an instruction to change the operation state of the link 3 according to the amount of data transfer. The instruction to change the operation state is issued by using, for example, a portion (field) of the communication descriptor destined to the Send queue in the MPI. In order to transmit and receive a majority of the communication having a large quantity of the data transfer in a state where the entire lanes 2 is enabled, the Rendezvous Send/Recv, the RDNA Put, or the RDMA Get is appropriate among one-to-one communication protocols. As described above, even though a time is required for turning ON (startup) the power supply of the lanes 2 (startup), when one of the three types of one-to-one communication protocol is employed, the entire lanes 2 is able to be in a state of being startup before the data transfer is started. Hereinafter, regarding each of the three types of one-to-one communication protocols, that is, the Rendezvous Send/Recv, the RDNA Put, and the RDMA Get, the specific operations of the information processing system 1 of the embodiment will be described.

[4-1] Rendezvous Send/Recv

First of all, descriptions will be made first on the operations of the information processing system 1 of the embodiment for a case where the one-to-one communication protocol is the Rendezvous Send/Recv with reference to FIG. 8. In the meantime, in FIG. 8, a CPU 141 of the Send buffer 10A executes the process #0 of a Send side by using a Send side memory area 14A. Further, a CPU 141 of the Recv Buffer 10B executes the process #1 of a Recv side by using a Recv side memory area 14B.

In the Rendezvous Send/Recv, the process #0 of the Send side (a transmission side) calls a transmitting function of MPI_Send (see, e.g., step S11). The process #0 transmits a "transfer destination buffer inquiry (Query)" message from the Send side to the Recv side (reception side) before the data body is transferred (see, e.g., step S12, arrow A11). In this case, the process #0 appends the instruction to operate the entire lanes for the Recv side to the "transfer destination buffer inquiry" message (see, e.g., step S12). Further, the process #0 issues the instruction to operate the entire lanes for the Send side (see, e.g., step S13). Accordingly, the operation state of the entire lanes 2 of the Send side switches from a state where a portion of the lanes are being operated to a state where the entire lanes are being operated, through a state where the lanes are in a startup state during the lane startup time "To" (see, e.g., FIG. 1).

In the meantime, the process #1 at the Recv side (reception side) calls a function for receiving MPI_Recv (see, e.g., step S21). Upon receiving the "transfer destination buffer inquiry (Query)" message to which the instruction to operate the entire lanes for the Recv side is appended, the process #1 replies a "notification of transfer destination buffer (Response)" message in response to the "transfer destination buffer inquiry (Query)" (see step S22, arrow A12). In the meantime, address information of the Recv Buffer in the Recv side memory area 14B in which data transferred from the Send side is to be recorded is included in the "notification of transfer destination buffer". Further, the process #1 issues the instruction to operate the entire lanes for the Recv side (see step S23). Accordingly, the operation state of all the lanes 2 of the Recv side switches from a state where a portion of the lanes are being operated to a state where the entire lanes are being operated, through the lane startup state.

At the Send side, the data transfer is started after the "notification of transfer destination buffer" message is sent back from the Recv side (see, e.g., step S14). In this case, a time enough for completing the startup of the entire lanes 2 and switching to a state where the entire lanes are being operated, remains at the Send side. Further, at the Recv side, a sufficient time has been elapsed after the instruction to operate the entire lanes for the Recv side is issued until the data is received. Accordingly, since the startup of the entire lanes 2 is completed at both the Send side and the Recv side at the time when the data transfer is started, the data transfer from the Send side to the Recv side is achieved without reducing the efficiency of data transfer. In the meantime, the data to be transferred is saved in the Send Buffer of the Send side memory area 14A, and the data read from the Send buffer is transferred to the Recv side to be recorded into the Recv Buffer of the Recv side memory area 14B (see, e.g., the arrow A13).

Further, an "instruction to switch operation of the lane 2" appended to the message in the Rendezvous Send/Recv affects on all links 3 on the data transfer path. The data transfer between adjacent links other than the Send side and the Recv side is handled as a portion of control by the network interface 1421. When the "inquiry" message in which the lane operation switching instruction (e.g., an instruction to operate the entire lanes/an instruction to stop the operation of a portion of the lanes) is contained is received at the time when the data is transferred between adjacent links, the node 10 changes the lane operation state of the Recv side link 3 according to the received lane operation switching instruction. The received message is delivered to the link 3 of the Send side as it is. In this case, the node 10 changes the lane operation state of the Send side link 3 according to the delivered lane operation switching instruction.

Thus far, regarding the Rendezvous Send/Recv, descriptions have been made on an operation that changes the operation state of the link 3 of the communication path to the entire lanes operation state before the data transfer. Next, regarding the Rendezvous Send/Recv, descriptions will be made on an operation that changes the operation state of the link 3 of the communication path from a state where all the lanes are being operated to a state where only a portion of the lanes 2 is being operated, that is, a state where the operation of the other portion of the lanes are stopped such that the power consumption is reduced after the data transfer is completed. That is, when the communication (a data transfer) requiring a wide bandwidth (e.g., a communication through the entire lanes 2) is completed, the instruction to stop the operation of a portion of the lanes is issued to change the operation state to a state where only the other portion of the lanes 2 is being operated in order to reduce the power consumption. The instruction to stop the operation of a portion of the lanes is issued at a side (e.g. the Send side in a case of the Rendezvous Send/Recv) from which the data is transferred. In the meantime, the instruction to stop the operation of a portion of the lanes may be appended to the position after the last transfer data so as to be functioned as a transfer completion flag, or may be appended to the message with which the transfer completion flag is sent.

As illustrated in FIG. 8, in the Rendezvous Send/Recv, when the data transfer is completed, the process #0 of the Send side transmits the message of the transfer completion flag to the Recv side (see, e.g., step S15, arrow A14). In this case, as described above, the transfer completion flag may also function as the instruction to stop the operation of a portion of the lanes for the Recv side, or an instruction to stop the operation of a portion of lanes for the Recv side may be appended to the message of the transfer completion flag.

The process #0 issues the instruction to stop the operation of a portion of the lanes with respect to the link 3 of the Send side after transmitting the transfer completion flag (see step S16). Accordingly, the operation state of the Send side lane is switched from a state where the entire lanes are being operated to a state where the operation of a portion of the lanes is stopped, that is, a state where the other portion of the lanes is being operated.

In the meantime, the process #1 of the Recv side which has received the transfer completion flag (an instruction to stop the operation of a portion of the lanes for the Recv side) sets the transfer completion flag in the Recv side memory area 14B and also confirms the completion of data transfer (see, e.g., step S24). Also, the process #1 issues the instruction to stop the operation of a portion of the lanes with respect to the link 3 of the Recv side (see, e.g., step S25). Accordingly, the operation state of the Recv side lane is switched from a state where the entire lanes are being operated to a state where the operations of a portion of the lanes are stopped, that is, a state where the other portion of the lanes are being operated.

[4-2] RDMA Put

Next, descriptions will be made first on the operations of the information processing system 1 of the embodiment for a case where the one-to-one communication protocol is the RDMA Put, with reference to FIG. 9. In the meantime, in FIG. 9, the CPU 141 of the Send buffer 10A executes the process #0 of a Send side by using a Caller side memory area 14A. Further, a CPU 141 of the Recv Buffer 10B executes the process #1 of a Recv side by using a Target side memory area 14B.

In the RDMA Put, data is transferred from a Caller Window on the Caller side (a transmission side) memory area 14A to a Target Window on the Target side (a reception side) memory area 14B. The process #1 at the Caller side needs an address of the target window in order to execute the data transfer. Accordingly, the process #0 of the Caller side calls a transmitting function of MPI_Put before the data transfer is started (see, e.g., step S31), transmits an "inquiry of Target Window (Query)" message from the Caller side to the target side (see, e.g., step S32, arrow A21), and waits for a response ("Response") from the target side.

In this case, the process #0 appends an instruction to operate all the lanes for the Target side to the "inquiry of Target Window" message in the process #0 (see, e.g., step S32). Further, the process #0 issues the instruction to operate all the lanes for the Caller side (step S33). Accordingly, the operation state of all the lanes 2 for the Caller side switches from a state where a portion of lanes is being operated to a state where all the lanes are operated, through a state where the lanes are starting up during the lane startup time "To" (see FIG. 1).

In the meantime, upon receiving the "inquiry of Target Window" message to which the instruction to operate the entire lanes for the Target side is appended, the process #1 of the Target side replies a "notification of Target Window (Response)" message according to the "inquiry of Target Window" (see, e.g., step S41, arrow A22). In the meantime, address information of the Target Window in the Target side memory area 14B in which data transferred from the Caller side is to be recorded is included in the "notification of Target Window". Further, the process #1 issues the instruction to operate the entire lanes for the Target side (see, e.g., step S42). Accordingly, the operation state of the entire lanes 2 for the Target side switches from a state where a portion of the lanes is operated to a state where the entire lanes are operated, through the lane startup state.

At the Caller side, the data transfer is started after the "notification of Target Window" message is sent back from the Target side (see, e.g., step S34). In this case, an enough time remains at the Caller side, for completing the startup of the entire lanes 2 and switching to a state where the entire lanes are operated. In the meantime, at the Target side, since a time, during which the message or data makes a round trip between the Caller side and the Target side once, has been elapsed after the instruction to operate the entire lanes for the reception side is issued until an initial data is received after transmitting the "notification of Target Window" message, a time enough for changing the operation state to a state where the all lanes are operated has been elapsed also at the Target side. Accordingly, since the startup of the entire lanes 2 is completed at both the Caller side and the Target side at the time when the data transfer is started, the data transfer from the Caller side to the Target side is achieved without reducing the efficiency of data transfer (see, e.g., the arrow A23).

In the meantime, an "instruction to switch operation of the lanes 2" appended to the message in RDMA Put affects on all links on the data transfer path. The data transfer between adjacent links other than the Caller side and the Target side is handled as a portion of control by the network interface 1421. When the "inquiry" message in which the lane operation switching instruction (e.g., an instruction to operate the entire lanes/an instruction to stop the operation of a portion of the lanes) is contained is received at the time when the data is transferred between adjacent links, the node 10 changes the lane operation state of the Recv side link 3 according to the received lane operation switching instruction. The received message is delivered to the link 3 of the transmission side as it is. In this case, the node 10 changes the lane operation state of the Send side link 3 according to the delivered lane operation switching instruction.

Thus far, regarding the RDMA Put, descriptions have been made on an operation that changes the operation state of the link 3 on the communication path to a state where all the lanes are operated before the data transfer. Next, regarding the RDMA Put, descriptions will be made on an operation that changes the operation state of the link 3 on the communication path from a state where the all lanes are operated to a state where only portion of lanes 2 is operated, such that the power consumption is reduced after the data transfer is completed. That is, when the communication (data transfer) requiring a wide bandwidth (the entire lanes 2) is completed, the instruction to stop the operation of a portion of the lanes is issued to change the operation state to a state where only some lanes 2 are being operated in order to reduce the power consumption. The instruction to stop the operation of a portion of the lanes is issued at a side from which the data is transferred (Caller side in a case of RDMA Put). In the meantime, the instruction to stop the operation of a portion of the lanes may be appended to the position after the last transfer data, so as to be functioned as a transfer completion flag, or may be appended to the message with which the transfer completion flag is sent.

As illustrated in FIG. 9, in RDMA Put, when the data transfer is completed, the process #0 of the Caller side transmits the message of transfer completion flag to the target side (see, e.g., step S35, arrow A24). In this case, as described above, the transfer completion flag may also function as the instruction to stop the operation of a portion of the lanes for the Target side as well and the instruction to stop the operation of a portion of the lanes for the Target side may be appended to the message of the transfer completion flag.

The process #0 issues the instruction to stop the operation of a portion of the lanes with respect to the link 3 of the Caller side after transmitting the transfer completion flag (see, e.g., step S36). Accordingly, the operation state of the Caller side lanes is switched from a state where the entire lanes are being operated to a state where the operation of a portion of the lanes is stopped, that is, a state where a portion of the lanes are being operated.

In the meantime, the process #1 at Target side which has received the transfer completion flag (an instruction to stop the operation of a portion of the lanes for the target side) sets the transfer completion flag in the target side memory area 14B and also confirms the completion of data transfer (see, e.g., step S43). Also, the process #1 issues the instruction to stop the operation of a portion of the lanes with respect to the link 3 of the Target side (see, e.g., step S44). Accordingly, the operation state of the target side lanes is switched from a state where the entire lanes are operated to a state where the operation of a portion of the lanes is being stopped, that is, a state where a portion of the lanes are being operated.

[4-3] RDMA Get

Next, descriptions will be made on the operations of the information processing system 1 of the embodiment for a case where the one-to-one communication protocol is the RDMA Get, with reference to FIG. 10. In the meantime, in FIG. 10, the CPU 141 of the Send buffer 10A executes the process #0 of the Send side by using a Caller side memory area 14A. Further, a CPU 141 of the Recv Buffer 10B executes the process #1 of the Recv side using a Target side memory area 14B.

A direction of data transfer by the RDMA Get is opposite to that by the RDMA Put, and data is transferred from the Target side (a reception side) to the Caller side by a request from the process #0 of the Caller side (a transmission side) in the RDMA Get. That is, in the RDMA Get, as will be described later, data is transferred from the target Window to the Caller Window in the process #1 of the Target side which has received "Get Request" from the Caller side. Accordingly, an address of the Caller Window is needed for the process #1 of the Target side and the information (which includes address) of the Target Window is needed for the process #0 of the Caller side in order to issue "Get Request".

In the RDMA Get, the process #0 of the Caller side calls a transmitting function of MPI_Put before the data transfer is started (see, e.g., step S51), transmits an "inquiry of Target Window (Query)" message from the Caller side to the Target side (see, e.g., step S52, arrow A31), and waits for a response ("Response") from the Target side.

In this case, the process #0 appends an instruction to operate the entire lanes for the Target side to the "inquiry of Target Window" message in the process #0 (see, e.g., step S52). Further, the process #0 issues the instruction to operate the entire lanes for the Caller side (step S53). Accordingly, the operation state of all lanes 2 for the Caller side switches from a state where a portion of lanes is operated to a state where all the lanes are operated, through a state where the lanes are starting up during the lane startup time "To" (see, e.g., FIG. 1).

In the meantime, upon receiving the "inquiry of Target Window" message to which the instruction to operate the entire lanes for the Target side is appended, the process #1 of the Target side replies a "notification of Target Window (Response)" message according to the "inquiry of Target Window" (see, e.g., step S61, arrow A32). In the meantime, the address information of the Target Window in the Target side memory area 14B in which data transferred from the Caller side is to be recorded is included in the "notification of Target Window". Further, the process #1 issues the instruction to operate the entire lanes for the Target side (see, e.g., step S62). Accordingly, the operation state of all lanes 2 for the Target side switches from a state where a portion of the lanes is operated to a state where the entire lanes are operated, through the lane startup state.

When the "notification of Target Window" message is sent back to the Caller side from the Target side, the process #0 sends the "data transfer request" message ("Get Response") to the Target side (step S54, arrow A33). In this case, the address information of the Caller Window on the Caller side memory area 14A in which the data to be transferred is recorded is appended to the data transfer request message.

The data transfer is started at the Target side after the "data transfer request" is received from the Caller side (see, e.g., step S63). In this case, data is received at the Caller side after the Caller side has received the "notification of Target Window" and sent the "data transfer request" to the Target side. That is, since a time, during which the message or data makes round trip between the Caller side and the Target side twice, has been elapsed, a time enough for changing the operation state to a state where all the lanes are operated has been elapsed at the Caller side. Further, since a time, during which the message or data makes round trip between the Caller side and the Target side once, has been elapsed before the data transfer is started, a time enough for changing the operation state to a state where all the lanes are operated has been elapsed also at the Target side. Accordingly, since the startup of the entire lanes 2 is completed at the Caller side and the Target side at the time when the data transfer is started, the data transfer from the Caller side to the Target side is achieved without reducing the efficiency of data transfer (see, e.g., arrow A34).

In the meantime, the "instruction to switch operation of the lane 2" appended to the message in the RDMA Get affects on all links on the data transfer path. The data transfer between adjacent links other than the Caller side and the Target side is handled as a portion of control by the network interface 1421. When the "inquiry" message in which the lane operation switching instruction (an instruction to operate the entire lanes/an instruction to stop the operation of a portion of the lanes) is contained is received at the time when the data is transferred between adjacent links, the node 10 changes the lane operation state of the Recv side link 3 according to the received lane operation switching instruction. The received message is delivered to the link 3 of the Send side as it is. In this case, the node 10 changes the lane operation state of the Send side link 3 according to the delivered lane operation switching instruction.

Thus far, regarding the RDMA Get, descriptions have been made on an operation that changes the operation state of the link 3 of the communication path to the entire lanes operation state before the data transfer. Next, regarding the RDMA Get, descriptions have been made on an operation that changes the operation state of the link 3 of the communication path from a state where the entire lanes are operated to a state where only a portion of the lanes 2 is operated, that is, to a state where the operation of the other portion of the lanes is stopped after the data transfer is completed, such that the power consumption is reduced. That is, when the communication (a data transfer) requiring a wide bandwidth (the entire lanes 2) is completed, the instruction to stop operation of a portion of the lanes is issued to change the operation state to a state where only a portion of the lanes 2 are being operated in order to reduce the power consumption. The instruction to stop the operation of a portion of the lanes is issued at a side from which the data is transferred (Target side in a case of the RDMA Get). In the meantime, the instruction to stop the operation of a portion of the lanes may be appended to the position after the last transfer data, so as to be functioned as a transfer completion flag, or may be appended to the message with which the transfer completion flag is sent.

As illustrated in FIG. 10, in the RDMA Get, when the data transfer is completed, the process #1 at the Target side transmits the message of the transfer completion flag to the Target side (see, e.g., step S64, arrow A35). In this case, as described above, the transfer completion flag may also function as the instruction to stop the operation of a portion of the lanes for the Caller side, and the instruction to stop the operation of a portion of the lanes for the Caller side may be appended to the message of the transfer completion flag.

The process #1 issues an instruction to stop the operation of a portion of the lanes with respect to the link 3 of the Target side after transmitting the transfer completion flag (see, e.g., step S65). Accordingly, the operation state of the Target side lane is switched from a state where the entire lanes are operated to a state where a portion of the lanes is operated.

In the meantime, the process #0 of Caller side which has received the transfer completion flag (an instruction to stop the operation of a portion of the lanes for the Caller side) sets the transfer completion flag in the Caller side memory area 14A and also confirms the completion of data transfer (see, e.g., step S55). Also, the process #0 issues the instruction to stop the operation of a portion of the lanes with respect to the link 3 of the Caller side (see, e.g., step S56). Accordingly, the operation state of the Caller side lane is switched from a state where the entire lanes are operated to a state where a portion of the lanes is operated.

[5] Effect of the Embodiment

As described above, according to the information processing system 1 of the embodiment, the startup of the lane 2 is performed by using a period (see, e.g., startup time "To" of FIG. 1) during which information required for the data transfer (transfer-control information) before the data transfer is acquired, and thus the startup time of the lanes 2 is concealed. Accordingly, the startup time of the lanes 2 is suppressed from being added to the communication delay time for the data body such that the data body may be transferred using a sufficient bandwidth. Accordingly, the power consumption of the entire information processing system 1 may be reduced without causing the reduction of the computational efficiency.

That is, the operation state of the high speed serial link 3 may be explicitly instructed according to use situations such as the communication patterns of the application 110 so as to reduce the power consumption of the entire information processing system 1 as a large-scaled computer. In other words, the application 110, the communication library 1221, or the network interface 1421 controls the operation state of the link 3 by taking the quantity of communication or timing into account, thereby reducing the power consumption of the entire information processing system 1. In the meantime, a user-level interface (e.g., MPI) is installed in order for the application 110 to perform an explicit instruction in the embodiment. Further, the operation situation of the high speed serial link 3 is allowed to be controlled by an external control. The external control scheme for the high speed serial link 3 is not limited to a specific control scheme.

[6] Others

As described above, while exemplary embodiments of the present disclosure have been described in detail, the present disclosure is not limited thereto, and various changes and modifications may be made thereto without departing from the subject matter of the present disclosure.

In the embodiment, the entire lanes 2 are operated during the data transfer but the present disclosure is not limiter thereto, and the number of lanes 2 to be operated during the data transfer may be set to be greater than the number of the lanes 2 that are being operated in a state where a portion of the lanes is operated. Further, lane 2 to be operated or to be stopped in a state where a portion of the lanes is operated may be determined by a known method.

In the meantime, since there exists no period, during which the transfer-control information required for the data transfer is acquired before the data transfer, in the Send/Recv protocol, the Send/Recv protocol is not targeted as a communication protocol in the embodiment. It may be determined that which one of the Send/Recv protocol and the Rendezvous Send/Recv protocol is to be used as the communication protocol, after taking the relationship between the power consumption and the communication time for an application into account. For example, when it is intended to execute the data transfer that places emphasis on latency and does not require a wide bandwidth (e.g., of which data amount is small), Send/Recv protocol may be selected. In the meantime, when it is intended to execute the data transfer that requires a wide bandwidth, the Rendezvous Send/Recv protocol may be selected and it may also be considered to configure the communication protocol so as to allow the control in the embodiment to be applied.

Further, when the MPI is not used, that is, the entire links 3 is controlled via the management software (SVP 150), the following controls are performed. That is, a specific link on the network is designated, an operation control instruction for the lane 2 is transmitted to the hardware at both ends of the designated link, and thus the ON/OFF of the lane 2 is controlled. Further, the application 110 requests the management software to control a link 3 in the network, which the application 110 is intended to control. The control software transmits a control packet to the link 3 by taking a usage rate of the entire system into account. A transmission protocol is the same as the MPI. Also, the network interface 1421 that has received the control packet controls the operation of the link 3.

Further, when, for example, the InfiniBand is used as network, a header area prepared for a vendor is utilized. That is, the message of operation instruction for the link 3 is transmitted/received by using the (header) area. The HCA (Host Channel Adapter) is able to modify and control the operation state of the link 3. The switch or the router 1422 modifies the SMA (Subnet Manager Agent) of, for example, control firmware of the switch.

Further, a system may be configured such that a user (an application 110) is assigned with a permission to determine and issue an instruction to a certain link 3 (an instruction to operate the entire lanes, an instruction to stop the operation of a portion of the lanes, an instruction to increase the number of the lanes, and an instruction to decrease the number of the lanes). In this case, the system is configured such that the user (e.g., the application 110) is allowed to reference a network topology or the current load situation to determine a link 3 to be controlled.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a first apparatus including a first processor; and
a second apparatus including a second processor, wherein the first apparatus and the second apparatus are coupled to
each other through a communication path provided with a plurality of lanes used for transferring data between the first and second apparatuses;

the first processor of the first apparatus being configured to:
  detect transfer-control information prior to data transfer that transfers data between the first and second apparatuses, the transfer-control information being exchanged, prior to the data transfer, between the first processor of the first apparatus and the second processor of the second apparatus over one or more of the plurality of lanes, the plurality of lanes other than the one or more lanes being in a powered-off state, during the exchange of the transfer-control information between the first and second processors, at least one additional lane of the lanes in the powered-off state being activated for use during the data transfer,
  notify the second apparatus of a lane-control instruction to increase a second lane-counter indicating a number of lanes used by the second apparatus, and
  increase a first lane-counter indicating a number of lanes used by the first apparatus so that the first lane-counter is greater than a number of lanes that have been used when detecting the transfer-control information; and
the second processor of the second apparatus being configured to, upon detecting the lane-control instruction to increase the second lane-counter notified from the first apparatus, increase the second lane-counter so that the second lane-counter is greater than a number of lanes that have been used when detecting the instruction.

2. The information processing system of claim 1, wherein the first processor of the first apparatus detects the transfer-control information whose amount is smaller than an amount of data that are transferred in the data transfer between the first and second apparatuses.

3. The information processing system of claim 1, wherein the first processor of the first apparatus detects the transfer-control information for which a time taken for startup of lanes used for the data transfer between the first and second apparatuses is less than a sum of a round-trip delay time for the transfer-control information and a transfer time of the transfer-control information.

4. The information processing system of claim 1, wherein the first processor of the first apparatus is configured to notify the second apparatus of the lane-control instruction by appending the lane-control instruction to the transfer-control information.

5. The information processing system of claim 1, wherein a portion of the plurality of lanes is used for exchanging the transfer-control information, and all of the plurality of lanes are used for the data transfer.

6. The information processing system of claim 1, wherein upon completion of the data transfer to the second apparatus, the first processor of the first apparatus notifies the second apparatus of completion of the data transfer, and causes a number of lanes used for communication after the completion of the data transfer, to be less than a number of lanes used for the data transfer; and
upon detecting completion of the data transfer notified from the first apparatus, the second processor of the second apparatus causes a number of lanes used for communication after completion of the data transfer, to be less than a number of lanes used for the data transfer.

7. The information processing system of claim 6, wherein
all of the plurality of lanes are used for the data transfer; and
a portion of the plurality of lanes is used for communication after completion of the data transfer.

8. The information processing system of claim 1, wherein
upon completion of the data transfer to the first apparatus, the second processor of the second apparatus notifies the first apparatus of completion of the data transfer, and causes a number of lanes used for communication after the data transfer, to be less than a number of lanes used for the data transfer; and
upon detecting completion of the data transfer notified from the second apparatus, the first processor of the first apparatus causes a number of lanes used for communication after the data transfer, to be less than a number of lanes used for the data transfer.

9. An apparatus coupled to a reception side information processing apparatus through a communication path provided with a plurality of lanes, the apparatus comprising:
a processor configured to:
  detect transfer-control information prior to data transfer that transfers data between the apparatus and the reception side information processing apparatus, the transfer-control information being exchanged, prior to the data transfer, between the apparatus and the reception side information processing apparatus over one or more of the plurality of lanes, the plurality of lanes other than the one or more lanes being in a powered-off state, during the exchange of the transfer-control information between the apparatus and the reception side information processing apparatus, at least one additional lane of the lanes in the powered-off state being activated for use during the data transfer,
  notify, upon detecting the transfer-control information, the reception side information processing apparatus of a lane-control instruction to increase a second lane-counter indicating a number of lanes to be used by the reception side information processing apparatus, and
  increase a first lane-counter indicating a number of lanes used by the apparatus so that the first lane-counter is greater than a number of lanes that have been used when detecting the transfer-control information; and
a memory coupled to the processor, the memory being configured to store information on lanes used for the apparatus.

10. The apparatus of claim 9, wherein
the processor detects the transfer-control information whose amount is smaller than an amount of data that are transferred in the data transfer between the first apparatus and the reception side information processing apparatus.

11. The apparatus of claim 9, wherein
the processor detects the transfer-control information for which a time taken for startup of lanes used for the data transfer between the apparatus and the reception side information processing apparatus is less than a sum of a round-trip delay time for the transfer-control information and a transfer time of the transfer-control information.

12. The apparatus of claim 9, wherein
the processor notifies the reception side information processing apparatus of the lane-control instruction by appending the lane-control instruction to the transfer-control information.

13. The apparatus of claim 9, wherein
a portion of the plurality of lanes is used for exchanging the transfer-control information, and all of the plurality of lanes are used for the data transfer.

14. An apparatus coupled to a transmission side information processing apparatus through a communication path provided with a plurality of lanes, the apparatus comprising:
a processor configured to:
detect transfer-control information prior to data transfer, the transfer-control information being exchanged between the transmission side information processing apparatus and the apparatus over one of more of the plurality of lanes, the plurality of lanes other than the one or more lanes being in a powered-off state, during the exchange of the transfer-control information between the apparatus and the transmission side information processing apparatus, at least one additional lane of the lanes in the powered-off state being activated for use during the data transfer;
detect a lane-control instruction to increase a lane-counter indicating a number of lanes used by the apparatus, which has been notified from the transmission side information processing apparatus, and
increase, upon detecting the lane-control instruction, the lane-counter so that the lane-counter is greater than a number of lanes that have been used when detecting the lane-control instruction; and
a memory coupled to the processor, the memory being configured to store information on lanes used for the apparatus.

15. The apparatus of claim 14, wherein
a portion of the plurality of lanes is used for exchanging the transfer-control information, and all of the plurality of lanes are used for the data transfer.

16. A method of an information processing system including first and second apparatuses that are coupled to each other through a communication path provided with a plurality of lanes, the method comprising:
upon detecting transfer-control information prior to data transfer that transfers data between the first and second apparatuses, notifying, by the first apparatus, the second apparatus of a lane-control instruction to increase a second lane-counter indicating a number of lanes to be used by the second apparatus, the transfer-control information being exchanged, prior to the data transfer, between the first and second apparatuses over one or more of the plurality of lanes, the plurality of lanes other than the one or more lanes being in a powered-off state, during the exchange of the transfer-control information between the first and second apparatuses, at least one additional lane of the lanes in the powered-off state being activated for use during the data transfer;

increasing, by the first apparatus, a first lane-counter indicating a number of lanes used by the first apparatus so that the first lane-counter is greater than a number of lanes that have been used when detecting the transfer-control information;

upon detecting the lane-control instruction to increase the second lane-counter which has been notified from the first apparatus, increasing, by the second apparatus, the second lane-counter so that the second lane-counter is greater than a number of lanes that have been used when detecting the instruction.

17. The method of claim 16, further comprising:
detecting, by the first apparatus, the transfer-control information whose amount is smaller than an amount of data that are transferred in the data transfer between the first and second apparatuses.

18. The method of claim 16, further comprising:
detecting, by the first apparatus, the transfer-control information for which a time taken for startup of lanes used for the data transfer between the first and second apparatuses is less than a sum of a round-trip delay time for the transfer-control information and a transfer time of the transfer-control information.

19. The method of claim 16, further comprising:
notifying, by the first apparatus, the second apparatus of the lane-control instruction by appending the lane-control instruction to the transfer-control information.

20. The method of claim 16, wherein
a portion of the plurality of lanes is used for exchanging the transfer-control information, and all of the plurality of lanes are used for the data transfer.

* * * * *